Figure 7:
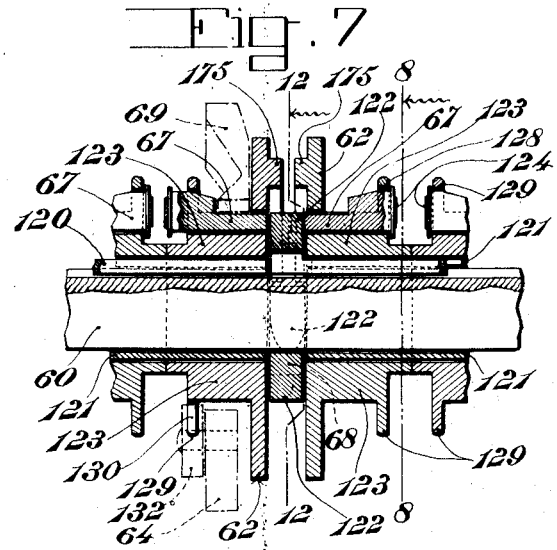

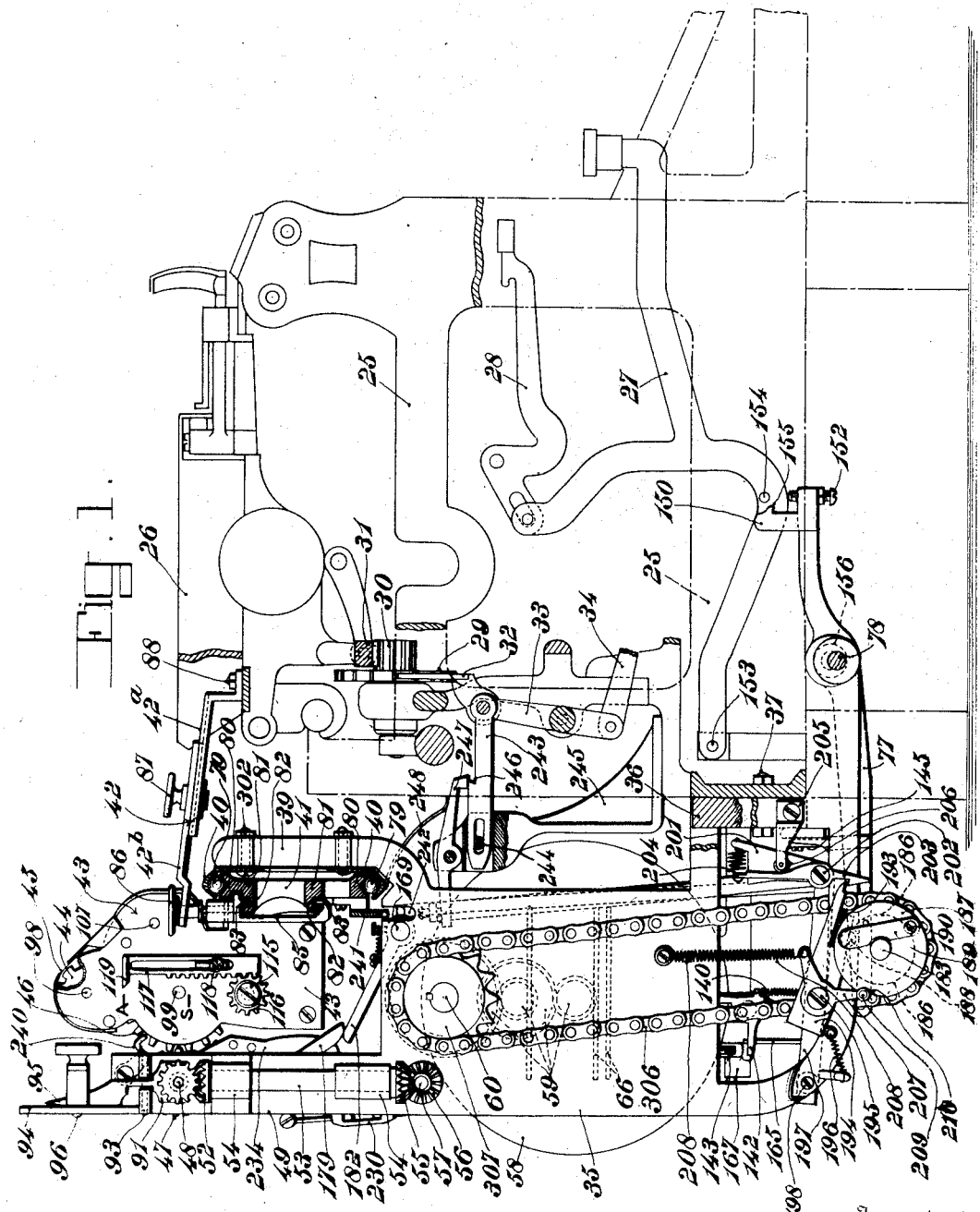

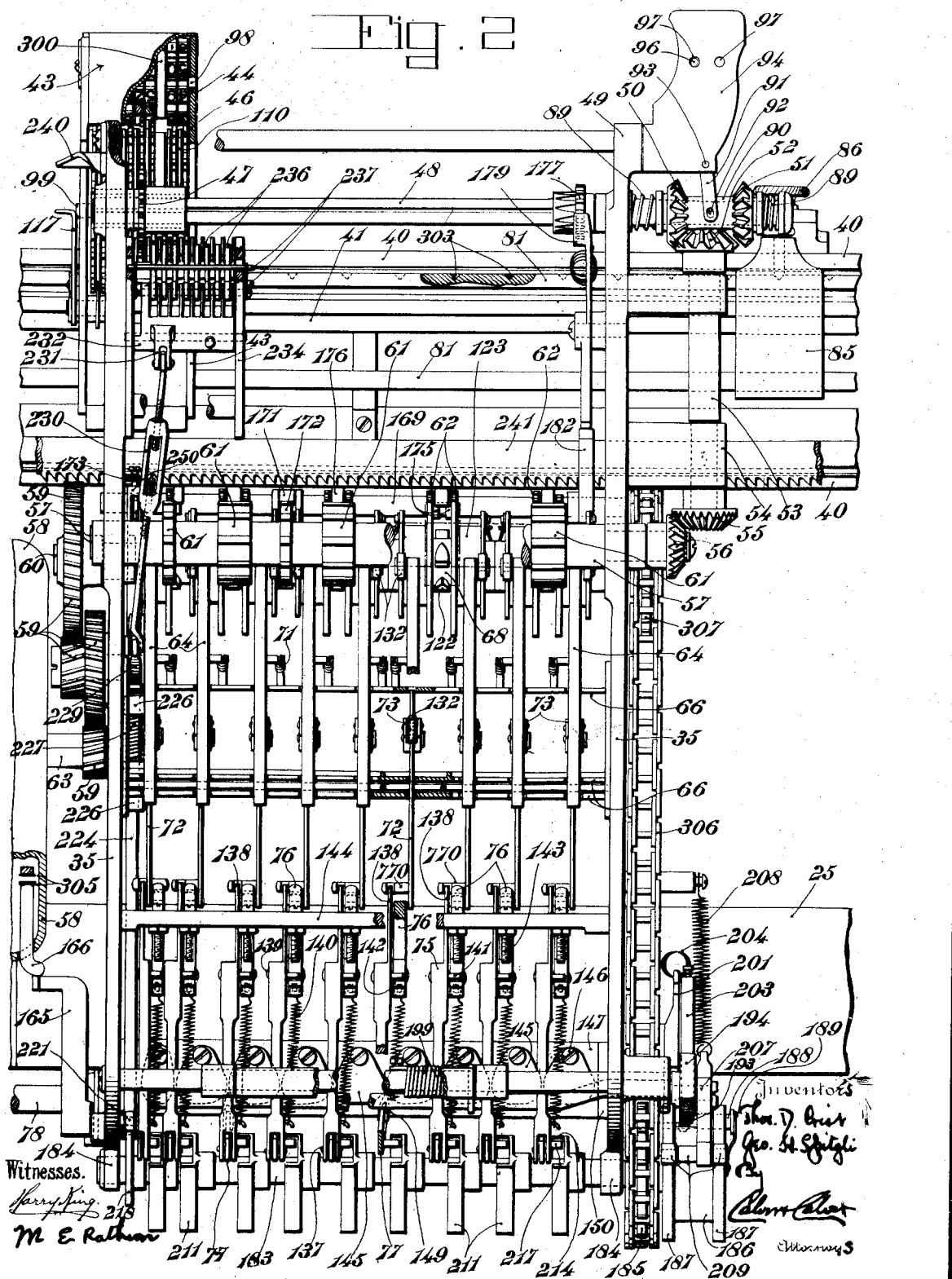

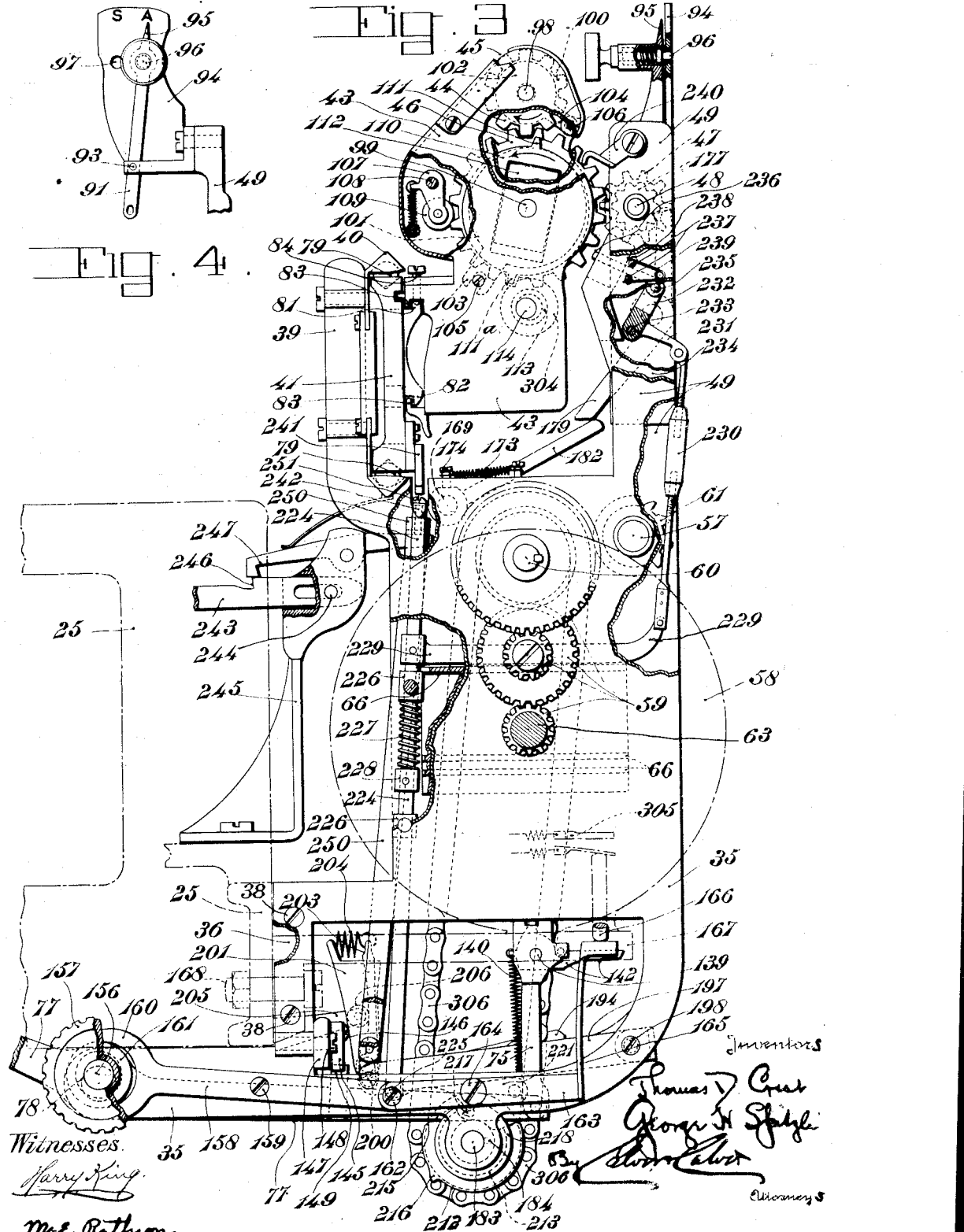

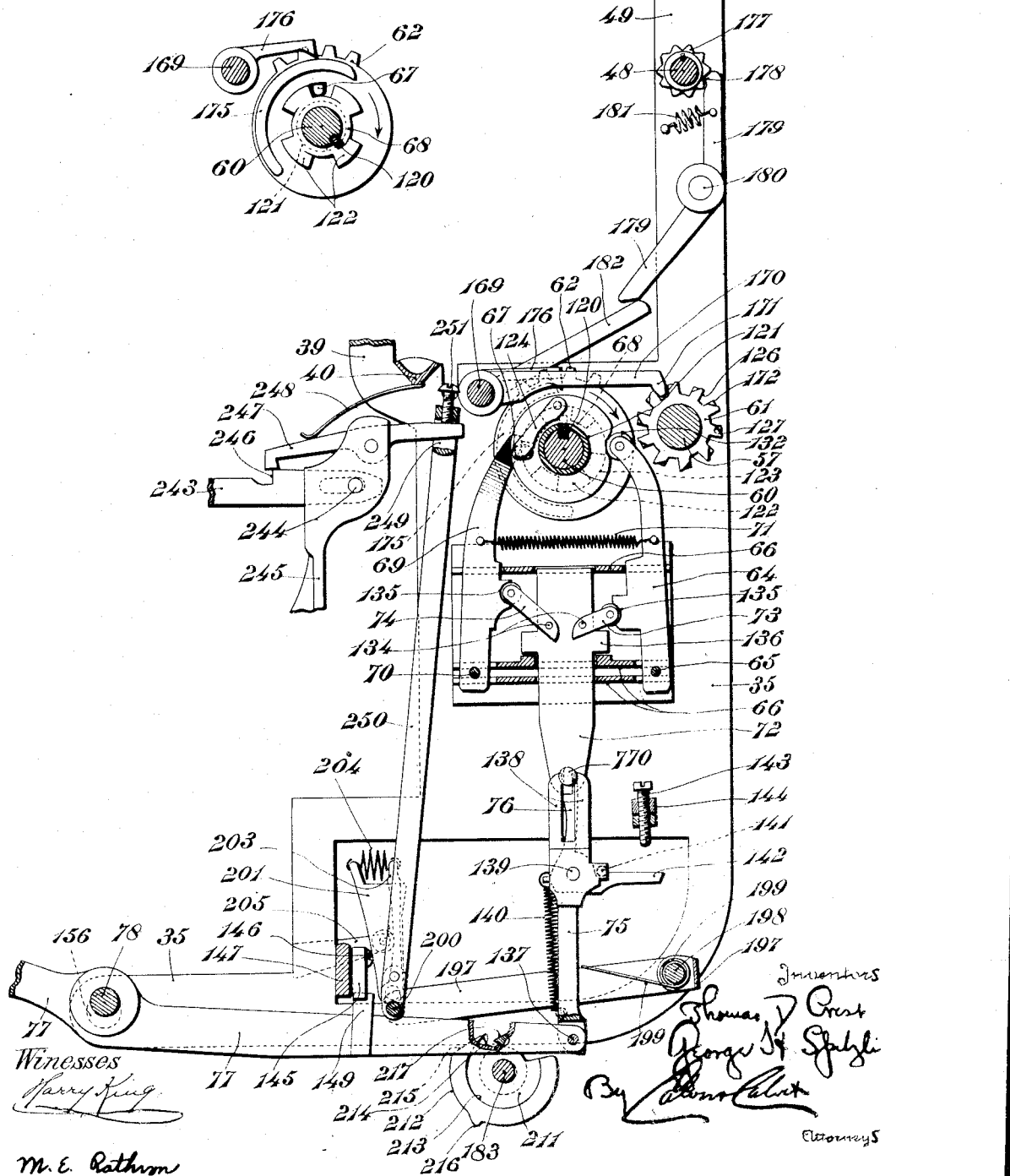

T. D. CRIST & G. H. SPITZLI.
CALCULATING MACHINE.
APPLICATION FILED FEB. 12, 1914.

1,194,718.

Patented Aug. 15, 1916.
7 SHEETS—SHEET 5.

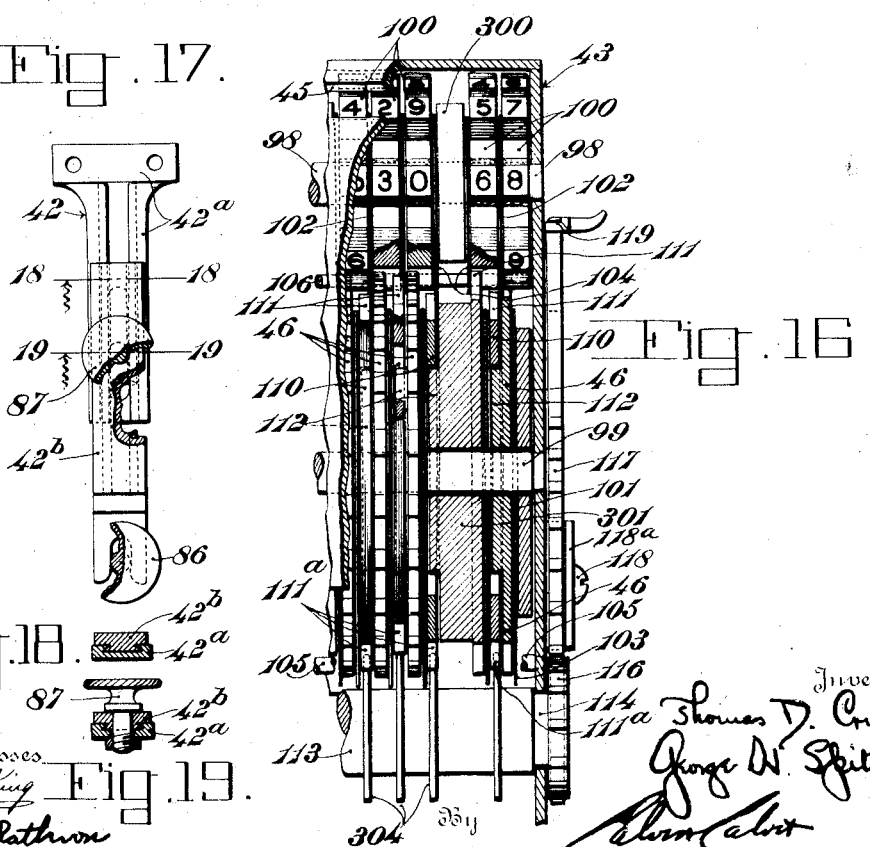

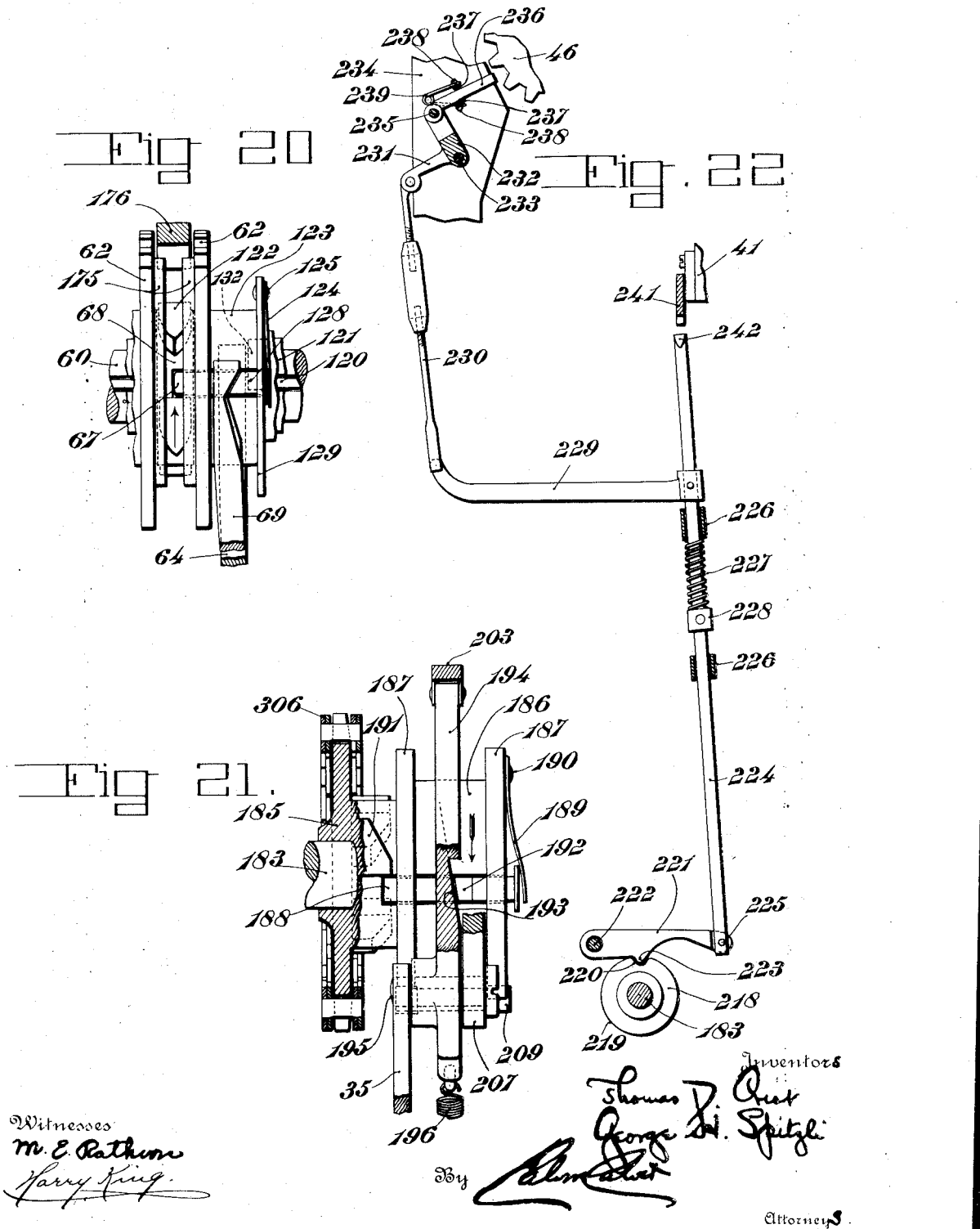

UNITED STATES PATENT OFFICE.

THOMAS D. CRIST, OF HOLLAND PATENT, AND GEORGE H. SPITZLI, OF UTICA, NEW YORK; SAID CRIST ASSIGNOR TO SAID SPITZLI.

CALCULATING-MACHINE.

1,194,718.     Specification of Letters Patent.     Patented Aug. 15, 1916.

Application filed February 12, 1914. Serial No. 818,217.

*To all whom it may concern:*

Be it known that we, THOMAS D. CRIST and GEORGE H. SPITZLI, citizens of the United States, residing at Holland Patent and Utica, respectively, in the county of Oneida and State of New York, have invented or discovered certain new and useful Improvements in Calculating-Machines, of which the following is a specification, reference being had therein to the accompanying drawings.

This invention relates to computing and registering mechanism and has reference more particularly to calculating mechanism designed for use as an attachment for typewriting machines, although, as will be clear to those skilled in the art from the following description, many features of the invention are not limited in their utility to their association with typewriting mechanism, but are capable of use in connection with computing or registering machines generally.

The general type of machine to which the present invention relates, when constructed as an attachment for typewriting machines, comprises a totalizer or registering mechanism moving with the typewriter carriage and including a series of index members or number wheels connected by suitable transfer mechanism and respectively actuated from operating gears which, during the feed of the typewriter carriage, are successively brought into coöperative relationship with a master gear and turned thereby. The amount of rotation of the master gear, and the consequent extent to which the totalizer is operated, is governed by an escapement or computing mechanism which, in turn, is controlled by means connected with the numeral key levers of the typewriter. The arrangement is such that, in writing upon a certain portion of the page, at each depression of one of the typewriter numeral keys, the totalizer will be actuated to vary one or more of the digits registered thereby by an amount depending upon the key depressed, while the order of the digit or digits so varied will depend upon the position of the typewriter carriage at that time.

The invention has for its general objects to provide calculating mechanism which is universally applicable to typewriting machines of substantially all well known types, which is as well capable of performing operations of subtraction and division as those of addition and multiplication, which is accurate and reliable in its results under all conditions of use, which is sufficiently quick in its action to accommodate itself to the work of the most rapid operator, which is convenient of operation so as to impose no additional labor upon, while requiring a minimum amount of attention from the operator, and which is provided with certain mechanical checks or safety devices whereby improper manipulation thereof either by accident or design, is prevented.

These general and other and more particular objects of the invention, together with means whereby the same may be carried into effect, will best be understood from the following description of one form or embodiment thereof illustrated in the accompanying drawings. It will be understood, however, that the construction described and shown has been chosen for illustrative purposes merely, and that the several features of the invention may be embodied in many other forms without departing from the spirit and scope thereof.

Figure 8:
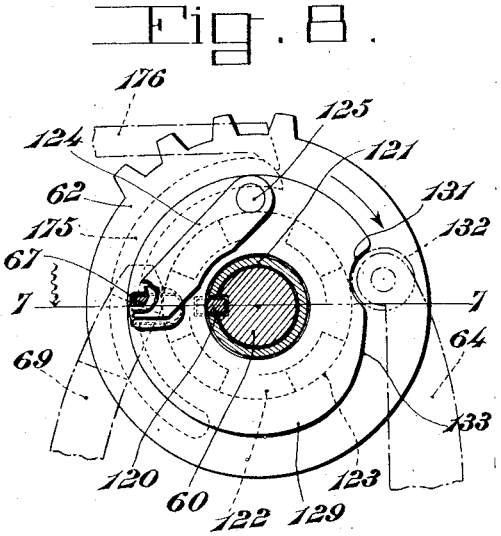
Figure 9:
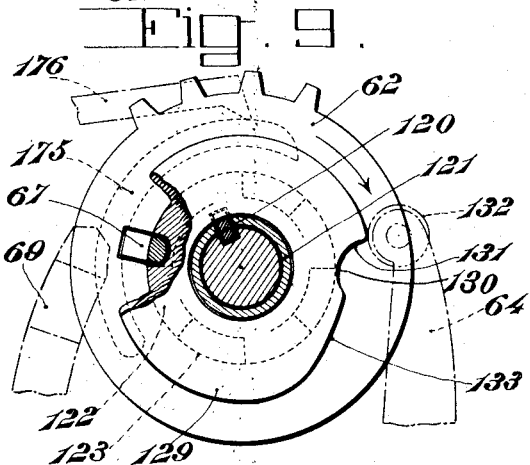
Figure 10:
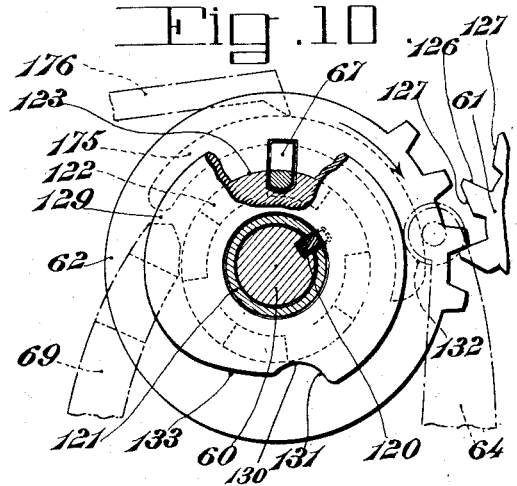
Figure 11:
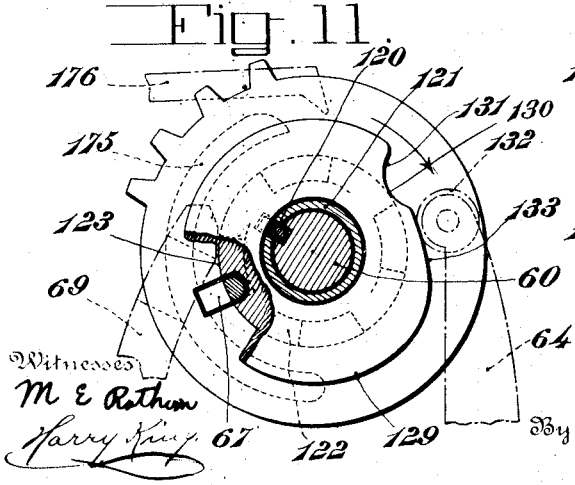
Figure 12:
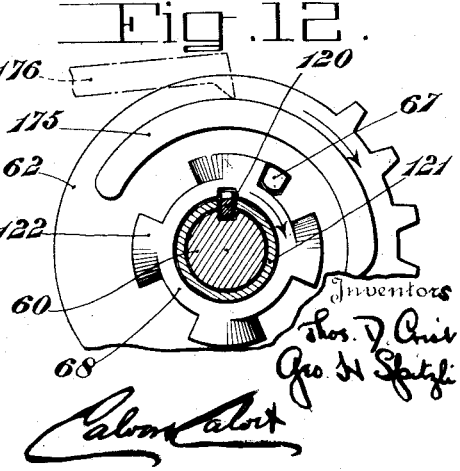

In said drawings: Figure 1 is a side elevation of a typewriter having applied thereto calculating mechanism constructed and arranged in accordance with the present invention, parts of the typewriter being omitted in order to avoid confusion, and parts of the calculating mechanism being broken away or shown in section. Fig. 2 is a rear elevation of the calculating mechanism. Fig. 3 is an enlarged elevation, partly broken away, of the calculating mechanism as viewed from the left in Fig. 2, or from the side opposite that shown in Fig. 1. Fig. 4 is a detail front elevation of the device for adjusting the mechanism for addition or subtraction. Fig. 5 is a vertical section, from front to rear, of the computing or escapement mechanism, showing one set of controlling devices in side elevation. Fig. 6 is a detail side elevation of one of the computing devices or mutilated gears and parts associated therewith. Fig. 7 is a detail longitudinal section, on the line 7—7, Fig. 8, of a portion of the series of parts on the main or actuating shaft. Fig. 8 is a section on the line 8—8, Fig. 7, showing the parts in their normal or stationary position. Figs. 9, 10 and 11 are views similar to Fig. 8 showing the parts in different positions assumed during the computing operation. Fig. 12 is a section on the line 12—12, Fig. 7, showing the parts in a position corresponding substantially to Fig. 10. Fig. 13 is a vertical section, from front to rear, of the totalizer. Figs. 14 and 15 are detail views of the totalizer separator plates between the number wheels and operating gears, respectively. Fig. 16 is an enlarged front elevation, partly in section, of a portion of the totalizer, the device for adjusting the totalizer for addition or subtraction being shown as on the side opposite to that shown in Fig. 1. Fig. 17 is a detail view, partly broken away, of the adjustable arm for connecting the typewriter and totalizer carriages. Figs. 18 and 19 are sections on the lines 18—18 and 19—19, respectively, Fig. 17. Fig. 20 is a detail elevation of one pair of computing devices and associated parts. Fig. 21 is a detail plan view, partly broken away, of the devices for actuating and controlling the auxiliary or cam shaft. Fig. 22 is a fragmentary elevation of the train of mechanism for preventing overthrow of the totalizer and for locking the totalizer carriage during the computing operation.

For convenience of description the principal elements of the machine will first be enumerated and their general purpose, arrangement and coöperation briefly explained in order to indicate the general operation of the machine as a whole, after which the preferred construction of these parts will be described more in detail together with the function, construction and operation of certain secondary or accessory mechanisms associated therewith.

25 denotes the frame of a typewriter having a carriage 26 which is fed forward step by step by a suitable spring and escapement mechanism at each actuation of any of the key levers 27 which operate the type bars 28. As shown in Fig. 1, the carriage escapement comprises an escapement wheel 29 having a pinion 30 which meshes with a rack 31 on the carriage 26, said escapement wheel 29 being controlled by a vibrating pallet 32 operated through a lever 33 and link 34 by the universal bar (not shown) of the typewriter.

The particular construction of the typewriter mechanism to which the calculating mechanism forming the subject of the present invention is applied is wholly immaterial, and the parts above referred to may be of any usual form and arrangement familiar to those skilled in the art.

The calculating mechanism is mounted in a frame comprising a pair of uprights 35 connected by a longitudinal base member or bracket 36 secured to the typewriter frame 25 by any suitable means, such as bolts 37. The end members or uprights 35 are preferably formed separate from the bracket or base member 36 and are secured thereto by bolts or screws 38. (See Fig. 3.) The uprights 35 are formed with upward extensions 39 which support a track 40 upon which is slidably mounted a totalizer carriage 41 connected with the typewriter carriage 26 by an arm 42 and carrying a totalizer 43. The mechanism of the totalizer is inclosed in a suitable casing and comprises a series of index members or number wheels 44 (see Figs. 3, 13 and 16) having on their peripheries consecutive numerals from "0" to "9" observable through an opening or slot 45 in the totalizer casing, said number wheels being each operated by a corresponding gear 46. As the typewriter carriage 26 is fed along in the usual operation of the machine, carrying with it the totalizer carriage 41, the gears 46 are, through a certain portion in each line, brought successively into engagement with a master gear 47 rotatably mounted on the frame. The lateral spacing between the gears 46, center to center, is equal to the length of the step through which the typewriter carriage 26 and totalizer carriage 41 are moved at each operation of the machine. It therefore follows that, through a certain portion of each line, the master gear will cause the several number wheels 44 to be successively turned through a greater or less distance dependent upon the amount of rotation of said master gears while in engagement with the corresponding gear 46.

The master gear 47 is mounted on a shaft 48 journaled in upward extensions 49 of the uprights 35 and connected through alternative gearing, comprising beveled gears 50, 51 and 52, with an upright shaft 53 journaled in bearings 54 formed on one of the extensions 49, said shaft 53 being connected by beveled gears 55 and 56 with a countershaft 57 provided with a series of gears 61 rigidly mounted thereon or formed integral therewith.

The gears 61 coöperate with a series of mutilated gears or computing devices 62 loosely mounted on the main actuating shaft 60 journaled in the uprights 35. The shaft 60 is connected, through suitable gearing 59, with the shaft 63 of a motor 58, preferably an electric motor, and continuously rotated thereby when the calculating mechanism is in use, said shaft 60, motor 58 and connections constituting the actuating mechanism or means of the machine. The gears 62 are equal in number to the numeral keys of the typewriter and are formed with a number of teeth progressively varying from 1 to 9 in accordance with the particular numeral key to which each of the several gears corresponds. Said gears 62 are normally held stationary by means of stop arms 64 pivoted at 65 to horizontal frame members 66 supported at their ends by the uprights 35. The gears 62 are provided with spring pressed clutch pins 67 adapted when released to engage hubs 68 keyed to the shaft 60, thereby clutching said gears to the shaft 60. The clutch pins 67 are normally held in retracted position by clutch controlling arms 69 pivoted at 70 to the frame members 66. The stop arm 64 and clutch controlling arm 69 corresponding to each gear 62 are connected by a spring 71 and normally held thereby in the position shown in Fig. 5. Corresponding to each pair of arms 64 and 69 is a slide 72 guided for vertical movement in the frame members 66 and provided with toggle arms 73 and 74 engaging respectively the arms 64 and 69, whereby when a slide 72 is moved upwardly the arms 64 and 69 are swung outwardly on their pivots away from the shaft 60. The corresponding clutch pin 67 is thereupon permitted to connect the corresponding gear 62 with the shaft 60 so as to rotate therewith. If the slide 72 be immediately released the gear 62 will immediately, after making one complete rotation, be unclutched from the shaft by the arm 69 and stopped in its initial position by the arm 64. During this rotation the teeth on the gear 62, by engagement with the corresponding gear 61, will cause the shaft 57, and consequently the master gear 47, to be rotated an amount corresponding to the number of teeth on the gear 62 in question.

The slides 72 are operated or raised by means of dogs 76 which are pivoted to slides 75 and which engage pins 770 projecting from the slides 72. The slides 75 are pivoted at their lower ends to the rear ends of operating members or arms 77 fulcrumed on a shaft 78 extending between the uprights 35. The forward ends of the arms 77 are extended beneath the numeral key levers 27 of the typewriter.

When a numeral key lever 27 is depressed engagement thereof with the forward end of the corresponding arm 77 causes the same to be rocked upon the shaft 78, thereby raising the corresponding slide 75 which, through its dog 76, raises the adjacent slide 72, causing the corresponding gear 62 to make one complete rotation with the shaft 60 as above explained.

The consequent rotation of the master gear 47 an amount corresponding to the number of teeth on the gear 62 so rotated will cause the totalizer 43 to be operated to vary one or more digits registered thereby a certain amount. It will be understood that the number of teeth on each of the gears 62 is equal or proportionate to the number represented by the numeral key lever by which it is controlled through the corresponding operating arm 77, slides 75 and 72, and controlling and stop arms 69 and 64. The amount by which any of the digits registered by the totalizer is varied therefore depends upon the key lever depressed, while the order of the digit or digits so varied depends upon the particular totalizer gear 46 in engagement with the master gear 47, and consequently upon the position of the typewriter carriage at that time.

The complete operation of the parts thus far described is as follows: The operator may manipulate the letter or numeral keys or space bar of the typewriter in the usual manner until the carriage 26 is brought to the point at which the master gear 47 is in engagement with one of the gears 46 of the totalizer. Suppose now that one of the numeral keys of the typewriter be depressed, for example the "4" key. The arm 77 connected with this key, acting through the slides 75 and 72, will cause the corresponding gear 62 to be clutched to and make one rotation with the shaft 60. The gear 62 (as shown in Fig. 5) corresponding to the "4" key is provided with four teeth, so that during its complete rotation the shaft 57, and consequently the master gear 47, will be caused to make a fraction of a rotation corresponding to such number of teeth, in the construction shown four tenths of a complete rotation. The totalizer gear 46 at that time in engagement with the master gear 47, and consequently the number wheel 44 operated thereby, will be actuated a corresponding amount, and, if the number wheels were all initially set at zero, the numeral "4" will be indicated by the number wheel in question at the index opening 45. Simultaneously with the release of the key lever the typewriter and totalizer carriages are moved forward one step, and the master gear 47 brought into engagement with the adjacent totalizer gear 46. Upon depression of the same or another numeral key another numeral will, in the manner above described, appear on the totalizer. In this manner, upon the completion of a line, the numbers written by the typewriting mechanism will be indicated upon the totalizer. As will now be apparent, when another line of numbers is written immediately beneath those referred to, the totalizer will be further operated in accordance with the numbers written and the sum of the two lines will be indicated thereby. This operation may be continued in accordance with the requirements of the work.

The general organization and operation of the mechanism as a whole having been thus outlined, the preferred construction of the various parts above referred to will now be described more in detail and the construction and operation of certain accessory mechanisms explained.

The track for the totalizer carriage 41 (see Figs. 1 to 3) is preferably composed of two members 40 independently secured to the upwardly extending portions 39 of the uprights 35 by means of bolts 302. Each of the members 40 is preferably of a V-shaped cross section, as shown most clearly in Figs. 1 and 3, to form a raceway for a series of balls 79 upon which the totalizer carriage runs. Said totalizer carriage comprises a frame having upper and lower grooved members 80 to receive the balls 79, and longitudinal members 81 upon which the totalizer is mounted. The members 81 are formed with upper and lower grooves 82 to receive hooked lugs 83 on the totalizer frame, which is placed upon the totalizer carriage by slipping the same over the end of said carriage and secured in place thereon by the engagement of a set screw 84 on the totalizer frame with any one of a series of recesses 303 in the uppermost member 81. By this arrangement it will be seen that the totalizer may be secured at substantially any desired point upon the carriage 41, and that if desired a plurality of totalizers may be employed according to the requirements.

85 denotes a clamp or brace formed with inturned lugs to engage the grooved members 81 of the totalizer carriage, and provided with a set screw 86 to engage one of the recesses 303, thereby rigidly securing said clamp to said totalizer carriage. The arm 42, for connecting the typewriter and totalizer carriages, is (see Figs. 17 to 19) preferably formed in two parts 42ᵃ and 42ᵇ whereby the effective length of said arm may be adjusted in accordance with the requirements of the particular typewriting machine with which it is used. To this end the part 42ᵃ is formed with an undercut groove and the part 42ᵇ with a dovetailed rib entering said groove and adapted to slide therein, said parts being secured in adjusted position by means of a bolt 87 passing through an opening in the part 42ᵇ and through an elongated slot in the part 42ᵃ. The part 42ᵃ may be connected to any suitable part of a typewriter carriage 26 by means of a bolt or bolts 88, while the part 42ᵇ is formed with a bifurcated end adapted to embrace the set screw 86.

When two lines of figures are written by the typewriting mechanism, one below the other, and the totalizer actuated as above described during the operation of writing both lines, the final result indicated by the totalizer will be the sum or the difference of the amounts so written depending upon whether the master gear is rotated in the same or in opposite directions at the time the two amounts are written.

In order to adapt the machine for subtraction as well as addition, the following mechanism is provided, reference being had to Figs. 1 to 4. As above described the shaft 53 is provided with a gear 52 coöperating with gears 50 and 51 on the master gear shaft 48. Said gears 50 and 51 are splined upon the shaft 48, so as to rotate therewith, but are movable longitudinally thereon, being normally pressed toward the gear 52 by springs 89 surrounding said shaft. 90 denotes a sleeve loosely mounted on the shaft 48 between the gears 50 and 51 and adapted when moved in opposite directions, to move either of said gears out of mesh with the gear 52 against the tension of the corresponding spring 89, the other gear 50 or 51 being simultaneously moved into engagement with the gear 52 by its spring 89. It will be seen that when the gear 51 is in engagement with the gear 52 the shaft 48 will be rotated in one direction, and when the gear 50 is in engagement with the gear 52 said shaft will be rotated in the opposite direction. For moving the sleeve 90 to adjust the machine for either addition or subtraction there is provided a lever 91 pivoted at 92 to the sleeve 90 and at 93 to a bracket 94 bolted or otherwise secured to the upwardly extending portion 49 of the adjacent upright 35. The upper end of the lever 91 is formed with a pointer or indicator 95 adapted to coöperate with suitable index characters on the face of the bracket 94 to indicate the adjustment of the mechanism for addition or subtraction. The lever 91 is further provided with a manually operated, spring pressed locking pin 96 adapted to engage either one of two openings 97 in the bracket 94 to retain the parts in adjusted position.

The totalizer 43 in the construction shown (see Figs. 2, 3, 13 and 16) comprises a casing in which are rigidly fixed two parallel shafts 98 and 99 upon which are rotatably mounted the number wheels 44 and the gears 46 respectively. The peripheries of the number wheels 44 are provided with index numerals and between said numerals with notches 100 for the engagement of the teeth on the gears 46. Preferably, and as shown most clearly in Fig. 16, at certain points in the series a number wheel 44 is omitted and a blank spacing disk 300 substituted therefor to provide spaces for decimal points or other punctuation marks. When so arranged the corresponding gears 46 are preferably formed with extended hubs 301 to bridge the punctuation spaces so provided.

In order to prevent improper operation of either the number wheels 44 or the gears 46 by frictional engagement with one another due to their adjacent coaxial positions on the shafts 98 and 99, there are interposed between the gears 46 thin plates 101 of sheet metal (see Fig. 15) and between the number wheels 44 similar plates 102 (see Fig. 14), said plates being all provided with bifurcated projections 103, 104, embracing rods 105 and 106 fixed in the totalizer casing, whereby rotation of said plates, and consequently communication of rotary movement from one of the gears or number wheels to the next, is prevented.

In order to center the index numerals with reference to the index opening 45 in the totalizer casing there is preferably provided a series of spring pressed levers 107 mounted on a rod or shaft 108 fixed in the totalizer casing, said levers carrying rollers 109 adapted to enter the spaces between the teeth of the gears 46.

In totalizing mechanism of the general character thus far described, one type of transfer mechanism heretofore employed for carrying from one of the digits or number wheels to the adjacent number wheel of the next higher order has been substantially as follows. Each of the gears for operating the respective number wheels has been provided, at a point adjacent every tenth tooth, with a rigid lateral extension projecting into the plane of the number wheel of the next higher order, the arrangement being such that when a number wheel which is set to register "9" is turned to or through the position to register "0" the number wheel of the next higher order is advanced one number. As above indicated, however, it is intended in the machine herein shown that the totalizer be capable of registering the results of either addition or subtraction merely by reversing the direction of rotation of the master gear and the consequent direction of actuation of the totalizing mechanism. With the prior construction described when a number wheel is set to register zero the extended tooth of the corresponding operating gear is in a position in which it is likely to be engaged by the number wheel of the next higher order if said last named number wheel be turned backwardly one or more numbers. If, therefore, in employing such prior construction for operations of subtraction, said number wheel of the higher order be turned backwardly one number by its operating gear, the carrying tooth engaged by said number wheel of the higher order, the operating gear by which said tooth is carried, and the adjacent number wheel of the lower order which is operated by said gear may also be turned backwardly, i. e., from "0" to "9," so that the amount subtracted from the total amount indicated on the totalizer will be only one tenth of the correct amount. In order to prevent this improper operation when the mechanism is used for subtraction the following construction is employed in the present machine: As herein shown (see Figs. 2, 3, 13 and 16) each of the gears 46 is provided with a suitable number of teeth, preferably a multiple of ten and herein shown as twenty. Carried by each of said gears, with the exception of that coöperating with the number wheel of the highest order, is a plate or disk 110 located in the plane of the number wheel of the next higher order and provided with two oppositely located transfer teeth 111 and 111ª. The disks 110 are connected with the gears 46 for rotation therewith but are arranged to slide transversely thereon in order to permit the transfer teeth carried thereby to be projected outwardly to positions adjacent to the teeth carried by said gears 46 or to be retracted into inoperative positions within the peripheries of said gears. Each of the gears 46 is provided centrally upon its lateral face with a rectangular projection 112, while each of the disks 110 is provided with a centrally located rectangular opening corresponding in width to the projection 112 but of a sufficiently greater length to permit the movements above referred to. Below the gears 46 is located a roller 113 provided at its ends with eccentric projections 114, 115, by which said roller is journaled in the totalizing casing, the axis of said journals lying in the plane of the axes of the shafts 98 and 99. Said roller normally occupies a fixed position in the totalizer casing, but by turning the same upon its eccentric journals it may be shifted laterally to carry its axis from one side to the other of the plane passing through the axes of the shafts 98 and 99 for a purpose hereinafter explained. The two extreme positions of the roller 113 are shown in Figs. 3 and 13 respectively. This roller is formed at suitably located points along its length, with annular grooves in which the toothed peripheries of the gears 46 are received and intermediate said grooves with disk-like projections 304 (see Fig. 16) adapted to engage the peripheries of the disks 110 and the teeth 111 and 111ª carried thereby.

The arrangement of parts is such that as a gear 46 is so turned as to carry a tooth 111 of the attached disk 110 across the plane connecting the axes of the shafts 98 and 99, the opposite tooth 111ª on the disk 110 will be engaged by the roller 113, so that the disk will be held with the tooth 111 which is adjacent to the number wheel 44 rigidly in operative position and in engagement with said number wheel. With the gear 46 in any other position, however, the tooth 111ª will be out of engagement with the roller 113, and the disk 110 correspondingly free to be moved transversely of the gear 46, thereby moving the tooth 111 inwardly to inoperative position.

It will therefore be seen that the transfer device for carrying from one number wheel to the next adjacent number wheel is automatically rendered operative, when the number wheel of the lower order is actuated, to carry from said number wheel of the lower order to the number wheel of the higher order at the proper time. The number wheel of the higher order, however, is not operated by the gear carrying the transfer device connecting it with the number wheel of the lower order but by another gear. When, therefore, the number wheel of the higher order is actuated by its gear, the transfer device connecting it with the number wheel of the lower order is inoperative, so that an erroneous carrying from the one to the other is prevented.

In order properly to effect its carrying function and at the same time in order to insure its inoperativeness at the proper time, it has been found that the arc of movement of the gear 46, through which the transfer tooth 111 is held in operative position, should extend for a greater distance from one side of the plane connecting the axes of the shafts 98 and 99 than from the other. For example, as shown in Fig. 3, if the direction of rotation of the gears 46 be from right to left, as shown by the arrow on said figure, the tooth 111 should be held in operative position for a sufficient time after passing to the left of the plane above referred to to effect its carrying function properly. On the other hand said tooth should not be rigidly held in operative position for a considerable distance to the right of said plane, otherwise it might be inadvertently caught by the number wheel of the higher order when said number wheel is actuated. The reverse of these conditions is true if the direction of rotation of the gears 46 be from left to right as indicated by the arrow on Fig. 13. In order to effect a positive control of the parts it is desirable that the roller 113 be rigidly supported, this being accomplished in the present case by journaling said roller at fixed points in the end walls of the totalizer casing. Under these circumstances, in order to fulfil the conditions above referred to, the axis of the roller 113 should lie at one side of the plane passing through the axes of the shafts 98 and 99 when the totalizer is actuated in one direction, as in addition, and at the opposite side of said plane when said totalizer is actuated in the opposite direction, as in subtraction. This shifting or adjustment of the axis of the roller 113 is provided for by the eccentric mounting thereof above referred to, while maintaining said roller in rigid position in either condition of adjustment. In order quickly and conveniently to adjust said roller for addition or subtraction one of the journals thereof is provided with a pinion 116 (see Figs. 1 and 16) which meshes with a rack 117 slidably mounted on the side of the totalizer casing as by means of a screw or stud 118 projecting from said casing and passing through a slot in said rack and which screw may, if desired, be provided with a washer 118ª, as shown in Fig. 16. The rack 117 may be formed with a suitable indicator 119 adapted to coöperate with suitable index symbols on the side of the totalizer casing to indicate the adjustment of the totalizer for addition or subtraction, as shown in Fig. 1. The pinion 116 and rack 117 may, of course, be located at either side of the totalizer as may be desired, being shown as applied to the journal 115 on the left side (as viewed from the front of the machine) in Fig. 1, and as applied to the journal 114 on the right side in Figs. 2 and 16.

Referring to Figs. 5 to 12 and Fig. 20, the hubs 68 are secured to the shaft 60 for rotation therewith by means of keys 120, and are held in proper position longitudinally of said shaft by spacing sleeves 121 formed with slots through which the keys 120 extend. Said hubs are formed with a series of radial lugs or projections 122, preferably formed with abrupt front faces and tapered rear faces as shown most clearly in Figs. 12 and 20. The gears 62 are preferably grouped in pairs, one at either side of each hub 68, and are rotatably mounted on the spacing sleeves 121, as clearly shown in Fig. 7. Each of said gears is formed with an extended hub 123 providing an extended bearing on the corresponding sleeve 121, and in which is slidably mounted the corresponding clutch pin 67 backed by a suitable flat spring 124 adapted, when permitted by the corresponding clutch controlling arm 69, to project said clutch pin into the path of movement of the lugs 122 on the adjacent hub 68. The springs are preferably secured to the outer faces of annular flanges 129 on the hubs 123 by screws 125. The hubs 68 being continuously rotated with the shaft 60, it follows that when a clutch pin 67 is projected forwardly by its spring 124 and into the position shown in Fig. 20, said clutch pin will be immediately engaged by one of the lugs or projections 122 on the adjacent hub 68, causing the corresponding gear 62 to rotate with the shaft. By providing a plurality of lugs or projections 122, any one of which is adapted to engage the clutch pin, the connection of the gear to the shaft will take place almost instantaneously upon the release of the clutch pin, the engagement of said pin 122 being facilitated by the inclined rear faces and abrupt front faces of the lugs.

As above mentioned, and as shown in Figs. 2 and 7, the gears 62 are arranged in pairs along the shaft 60, and in the preferred construction both of the gears 62 of each pair are arranged to coöperate with a single gear 61 on the shaft 57, thereby reducing the necessary number of gears 61. The gears 62 being mutilated, in order to insure their proper engagement at each operation with the corresponding gears 61, the teeth on said gears 61 are preferably formed (as shown most clearly in Figs. 5 and 10) with abrupt rear faces 126 for engagement by the teeth of the gears 62, and with inclined or cut away front faces 127 which are readily cleared by the teeth of the gears 62, thereby preventing jamming or improper engagement of the gears.

The clutch pins 67 are provided with heads 128 having on their sides toward the faces of the gears 62 inclined surfaces (see Fig. 20), which are engaged by the inclined or wedge shaped ends of the clutch-controlling arms 69, which arms occupy normal positions upon the peripheries of the hubs 123 between the faces of the gears 62 and the clutch pin heads 128, as shown in dotted lines at the left of Fig. 7, this normal position being also illustrated in Figs. 5 and 8. Upon movement of an arm outwardly from its normal position (as shown in Fig. 9), the corresponding clutch pin 67 is operated by the spring 124 to couple the corresponding gear 62 to the shaft 60, as above explained. If said arm be immediately released and permitted again to engage the surface of the hub 123, as shown in Fig. 10, the end of said arm will, as the gear 62 approaches the completion of one rotation, engage the inclined face of the clutch pin head, as shown in Fig. 20, and, during the final portion of the rotation of the gear 62, cause said clutch pin to be withdrawn against the tension of its spring, as indicated in Fig. 7, and the gear 62 to be uncoupled from the shaft 60 and stop in its initial position.

The annular flanges 129 on the hubs 123 are provided with notches 130 forming stop shoulders 131 coöperating with rollers 132 on the ends of the stop arm 64. The normal position of the parts, when a gear is unclutched from the shaft and in stationary position, is that shown in Figs. 5 and 8, in which position the roller 132 lies within the notch 130 and engages the stop shoulder 131. When a clutch controlling arm 69 is swung outwardly to cause the connection of a gear 62 with the shaft 60, as shown in Fig. 9, the corresponding stop arm 64 is also swung outwardly, as hereinafter more fully explained, thereby causing the roller 132 thereon to disengage the stop shoulder 31. During the rotation of the gear 62 with the shaft 60 the roller 132 rides upon the periphery of the flange 129, so that as the gear 62 completes its rotation and is uncoupled from the shaft, as above explained, the roller 132 will again enter the notch 130 and engage the stop shoulder 131, causing said gear 162 to be stopped and held in its original, predetermined position which is thus accurately fixed. In order to facilitate the entry of the rollers into the notches 130 the peripheries of the flanges 129 are preferably slightly cut away in advance of said notches to form cam surfaces 133 which assist in directing the rollers 132 into the notches 130.

In order to lock the mechanism against movement at improper times, and to prevent overthrow of the parts under the influence of momentum caused by the high speed at which the machine is preferably run, the following mechanism is provided, reference being had particularly to Figs. 2, 5, 6, and 8 to 12. 169 denotes a rock shaft journaled in the computer frame, and provided with an arm 170 having at its end an angular finger 171 coöperating with a locking disk 172 on the shaft 57. Said locking disk is formed with a series of locking notches equal in number to the teeth of the gears 61. The finger 171 is normally engaged with one of the notches in the disk 172, thereby positively locking the shaft 57 against rotation, by means of a spring 173 (see Fig. 3) connected at one end to the framework and at its opposite end to a stud 174 projecting from the shaft 169. Each of the gears 62 is provided, on its lateral face adjacent the other gear 62 of the pair with a cam projection 175 coöperating with an arm 176 rigidly secured to the shaft 169, there being one arm 176 for each pair of gears 62 and said arms coöperating with the adjacent cam projections 175 of both gears of the pair. The arrangement is such, as will be clear from Figs. 8 to 12, that when a gear 62 is coupled to the shaft 60 and commences to rotate therewith, the cam projection 175 thereon will immediately lift the corresponding arm 176, thereby rocking the shaft 169 and lifting the finger 171 out of engagement with the locking disk 172, so that the shaft 57 is free to be rotated by said gear 62. The length of the cam projection 175 on each gear is in accordance with the number of teeth on the gear, the arrangement being such that at, or just prior to, the time when the last tooth on the gear 62 passes out of engagement with the corresponding gear 61 the end of the cam projection 175 will pass out of engagement with the corresponding arm 176, thereby causing the shaft 169 to be again placed under the influence of the spring 173, so that the finger 171 will engage a notch in the locking disk 172, said locking disk having been turned through a number of notches equal to the number of teeth on the gear 62 in question. Preferably the arrangement is such that the finger 171 will be permitted to engage the periphery of the locking disk 172 between two notches just prior to the disengagement of the teeth on the gear 62 from the gear 61, so that the engagement of said finger 171 with the next adjacent notch in the locking disk will be assured. It will be understood from the foregoing that the finger 171 acts positively to lock the shaft 57 against further movement after the same has made that portion of a rotation properly caused by the complete rotation of any of the mutilated gears or computing devices 62, and that this locking is effected by means associated with said gears or computing devices themselves. By this means the shaft 57 and parts actuated thereby are locked at all times except during portion of the rotation of a gear 62 and the accurate requisite angular movement of said shaft 57 is assured.

As the totalizer gears are, as heretofore explained, moved successively past and into and out of engagement with the master gear, it is desirable that said master gear be at all times properly positioned angularly with respect to the angular position of the totalizer gears in order to prevent the teeth on the master and totalizer gears from engaging one another and preventing the proper lateral movement of the totalizer as the typewriter carriage is fed. In order thus properly to position the master gear angularly at the completion of each operation, the master gear shaft 48 is (see Figs. 2 and 5) provided with a sleeve 177 keyed or otherwise rigidly secured thereto and provided with peripheral angular notches or grooves equal in number to the teeth on the master gear. Coöperating with these notches is the angular or wedge-shaped end 178 of a lever 179, pivoted at 180 to the upward extension 49 of one of the uprights 35 and normally held in the position shown in Fig. 5 by a spring 181. The end of the lever 179 opposite the finger 178 is engaged by an arm 182 on the shaft 169. When the shaft 169 is rocked during the computing operation by an arm 176 and cam 175, as above explained, the engagement of the arm 182 with the lever 179 causes said lever to be rocked in opposition to its spring 181 to disengage the finger 178 from the sleeve 177. Upon the completion of the computing operation the lever 179 is again placed under the influence of its spring 181, and the finger 178 engaged with the adjacent notch in the sleeve 177. Should the master gear shaft 48 have been left slightly out of its proper angular position, engagement of the inclined finger 178 with the inclined notches of the sleeve 177 will cause the latter to turn slightly in the requisite direction to center the master gear properly.

The toggle arms 73 and 74 (see Fig. 5) are pivoted at 134 to the slides 72 and are provided at their upper or outer ends with rollers 135 which engage suitable recesses in the inner faces of the arms 69 and 64. Upon upward movement of the slide 72 the arms 73 and 74 will operate to swing outwardly the arms 64 and 69 against the tension of the spring 71 to cause the connection of the corresponding gear 62 with the shaft 60, as above explained. Subsequent release or downward movement of the slide 72 will cause the arms 64 and 69 to be again placed under the influence of the spring 71 and in condition to uncouple the gear 62 from the shaft 60 and stop the same in its initial position at the end of one complete rotation. In order to limit the downward movement of the slides 72 and fix their normal positions, said slides are preferably formed with projecting lugs 136 adapted to engage the upper surface of one of the horizontal frame members 66. As shown in Fig. 5 the toggle arms 73 which control the stop arms 64 are of less length than the toggle arms 74 which operate the arms 69. Only slight movements of the arms 64 by the slides 72 are necessary, inasmuch as the stop shoulders 131 on the flanges 129 are inclined rather than abrupt, so that the arms 64 will, if necessary be forced outwardly by the cam surfaces so formed to the desired extent. On the other hand, it is necessary to provide for a sufficient movement of the arms 69 by the slides 72 to insure their complete disengagement from the clutch pin 67, and the toggle arms 74 are therefore made of a sufficient length to make this operation certain.

The slides 75, which are pivoted at 137 to the inner ends of the operating arms or members 77, are formed with forked or bifurcated upper ends 138 which embrace flattened portions of the pins 770 on the slides 72, thereby coupling the slides 75 and 72 and guiding the movements of the former with respect to the latter. The dogs 76 are pivoted at 139 to the slides 75 and are normally held in position to engage the pins 770 by springs 140 and stop pins 141. Upon upward movement of a slide 75, engagement of the dog 76 carried thereby with the pin 770 of the corresponding slide 72 will cause upward movement of said slide 72 for the purpose above explained. The dogs 76 are provided with trip arms 142 adapted, as the slides 75 approach the limit of their upward movement, to engage adjustable stop screws 143 carried by a transverse bar 144 of the framework. Engagement of a trip arm 142 with a stop screw 143 causes the corresponding dog 76 to be rocked on its pivot 139, thereby releasing the pin 770 and permitting the slide 72 to return to normal position. By this arrangement the immediate release of an elevated slide 72, and the consequent stopping of the gear 62 at the end of one complete rotation, is insured, even though a depressed numeral key lever be not immediately released by the operator.

In order to prevent the simultaneous depression of more than one numeral key lever at a time, there is provided (see Figs. 1 to 5, and particularly Fig. 2) a series of swinging wedge plates or blocks 145 pivoted at 146 to a bar 147 extending transversely of the computer frame and secured to the uprights 35 as by screws 148. Each operating arm or member 77 is formed or provided with a wedge portion or member 149 adapted, when said arm is operated, to enter between two adjacent swinging plates or blocks 145 and move the same laterally. The bar 147 is formed with end flanges 150 which limit the combined swinging movement of all of the plates or blocks 145 collectively to an amount substantially equal to the thickness of one of the wedge members 149, so that when one of the arms 77 has been operated the entire available slack in the wedge system will have been taken up and the operation of another arm 77 prevented.

Means are provided for detachably and adjustably connecting the operating arms 77 with the numeral key levers 27 of the typewriter, said means, as herein shown (see Fig. 1), comprising a rider or pair of arms 150 and an adjusting screw 152 carried by each of the arms 77. The arms 150 embrace the key levers but are normally otherwise disconnected therefrom, so that the operating arms may be readily slipped into place on any typewriter and may equally easily be removed without the necessity of removing or loosening any screws, rivets, straps or other attaching means. The adjusting screws 152 lie in the paths of movement of the key levers and are engaged thereby when said levers are operated, the arms or riders 150 constituting a loose lost motion connection between the arms and levers, the amount of lost motion being adjustable by means of the screws 152. The key levers 27, which are pivoted in the typewriter frame at points 153 remote from the axis of oscillation 78 of the arms 77, are preferably provided with laterally projecting pins or lugs 154 normally lying slightly above and at one side of hooked lugs 155 on the arms 150. As will be seen from Fig. 1, the lugs 154 and 155 do not, when the key levers are in normal position, interfere with the free movement of the arms 77 toward and from said key levers. When, however, a key lever is depressed the separation of the axes of oscillation of said lever and of the corresponding arm 77 causes the pin or lug 154 to swing beneath the hooked end 155 of the arm 150, thereby positively coupling the key lever and operating arm for a purpose hereinafter more fully explained.

In order to enable the operator to render the computing mechanism operative or inoperative at will the shaft 78 upon which the operating arms 77 are fulcrumed is provided (see Figs. 1, 3 and 5) adjacent its ends with eccentric portions 156 upon which said shaft is journaled in the uprights 35 of the computer frame. Said shaft 78 is provided at one end with an operating handle 157 (Fig. 3) by which said shaft may be turned on its eccentric journals, thereby raising and lowering said shaft bodily and raising or lowering the forward ends of the arms 77 into and out of position to be engaged by the typewriter key levers 27 when the latter are operated. Referring to Fig. 3, 158 denotes a lever pivoted at 159 to one of the uprights 35 and having a slotted end 160 which embraces an enlargement 161 on the shaft 78 concentric with said shaft but eccentric to the journals 156. At its opposite end the lever 158 is connected at 162 to a lever 163 pivoted at 164 to the upright 35 and provided at its end with an angular upstanding arm 165. Said arm 165 is adapted to coöperate with a plunger or sliding pin 166 for operating the switch 305 which controls the current to the electric motor 58. When, therefore, the handle 157 is turned to connect or disconnect the calculating mechanism and the typewriter keys, the levers 158 and 163 will be simultaneously operated to close or open the switch controlling the current to the electric motor, thereby starting or stopping said motor.

The motor 58, as indicated by dotted lines in Fig. 3, is preferably mounted on a bracket 167 separate from the computer frame and separately secured to the typewriter frame by bolts 168, thereby permitting motors of slightly different forms or types to be employed and suitably disposed with reference to the computing mechanism to connect properly therewith through the gearing 59.

In order to insure the proper operation of the calculating mechanism at each depression of a typewriter key lever the following mechanism is provided, reference being had to Figs. 1, 2, 3, 5 and 21: 183 denotes an auxiliary or cam shaft journaled in bearings 184 secured to the uprights 35 of the computer framework, said shaft extending transversely of the mechanism immediately beneath the rear ends of the operating arms 77. Loosely mounted on the shaft 183 is a sprocket wheel 185 connected by a chain 306 with a sprocket 307 keyed to the main actuating shaft 60. Fast upon the shaft 183 is a hub 186 (see particularly Fig. 21) having opposite end flanges 187 in which is slidably mounted a clutch pin 188. The clutch pin 188 is laterally movable, by means of a flat spring 189 secured by a screw 190 to the outer face of one of the flanges 187, into a position to be engaged by lugs 191 on the face of the continuously rotated sprocket 185, thereby clutching said hub to said sprocket and causing said shaft 183 to be rotated. The clutch pin 188 is normally held in its retracted or inoperative position by engagement of its beveled head 192 with a beveled or inclined shoulder 193 on an arm or lever 194 (see also Fig. 1) pivoted on a stud 195 projecting from the framework, and normally held by a spring 196 with said wedge-shaped shoulder 193 in engagement with the periphery of the hub 186 between the flanges 187. Upward movement of the lever 194 on its pivot causes the shoulder 193 to release the head 192 of the clutch pin 188, permitting the spring 189 to move said clutch pin into the position to couple the shaft 183 and sprocket 185.

The lever 194 is raised at each operation of any of the numeral keys, in order to permit the shaft 183 to make one complete rotation with the sprocket 185, by the following means. 197 (see Fig. 5) denotes a rocker pivoted on a rod 198 supported in the uprights 35, said rocker being normally held with its forward end depressed in the position shown in Figs. 1, 3 and 5 by means of a spring 199 surrounding said rod and secured at its opposite ends to said rod and rocker respectively. The rocker 197 carries at its forward end a universal bar 200 which extends across and rests upon all of the operating arms 77, so that upon operation of any of said arms the forward end of said rocker will be raised against the tension of the spring 199. At its end adjacent the sprocket 185 and hub 186 (see Figs. 1, 3 and 5) the rocker 197 carries a plate 201 to which is pivoted at 202 a lever 203 having a hooked lower end and an upper end connected by a spring 204 with the plate 201, whereby said lever is normally held with its hooked lower end in a position to engage and raise the end of the lever 194 when the rocker 197 is operated. 205 denotes a bracket secured to the adjacent upright 35 and carrying at its end a roller 206 engaging an inclined rear face on the lever 203 whereby, as the plate 201 is raised by operation of the rocker 197, the lever 203 will be turned upon its pivot against the tension of the spring 204 to cause the hooked lower end thereof to release the lever 194 after it has raised the same a sufficient amount to permit the clutch pin 188 to be thrown in, thereby causing said lever 194, under the influence of the spring 196, to return to normal position in which the shoulder 193 will engage and withdraw the clutch pin 188 after one complete rotation of the shaft 183. In the position of the parts shown in Fig. 21 the head 192 of the clutch pin 188 has been brought into engagement with the shoulder or incline 193 on the lever 194 (the shaft 183 having made nearly but not quite a complete rotation), but has not yet been moved thereby, so that the end of said clutch pin is still in engagement with one of the lugs 191 on the sprocket 185. Further movement of the shaft 183 and hub 186 in the direction of the arrow on Fig. 21, completing the rotation of these parts, causes the head 192, by engagement with the incline 193, to be moved toward the right, thereby disengaging the end of the clutch pin 188 from the lug 191 and unclutching the shaft 183 from the sprocket 185.

207 (see Figs. 1 and 21) denotes a lever pivoted on the stud 195 and normally held in the position shown in Fig. 1 by means of a spring 208. Said lever carries at its lower end a stop bar preferably provided with rollers 209 adapted, when the parts are in normal position, to enter cam recesses or notches 210 in the edges of the flanges 187 of the hub 186. Upon withdrawal of the clutch pin 188 by the shoulder 193 on the lever 194, the rollers on the bar 209 are forced by the spring 208 into the notches 210, thereby stopping the hub 186 and shaft 183 in their original, predetermined position.

Fixed upon the shaft 183 is a series of cams 211 (see Figs. 2 and 5) equal in number to the operating arms 77. Each of said cams (see Fig. 5) is formed with an outer cam surface 212 and an inner cam surface 213 which surfaces meet in an edge or angle 214. The cam surface 212 is, for most of its length, concentric with the shaft 183, but is connected with the edge or angle 214 by an inclined portion 215 and is provided, at a suitable point, with a projection 216. The cam surface 213 is concentric with the shaft 183 throughout. The cam surfaces 212 and 213 of the cams 211 coöperate with pins or lugs 217 projecting from the arms 77 and preferably formed with wedge-shaped forward faces as shown in Fig. 5. The arrangement is such that, when an arm 77 has been operated and the cam shaft 183 caused to rotate as above described, the edge 214 of the cam 211 corresponding to that arm will pass beneath the forward edge of the lug 217, causing said arm to be locked in operated position until the cam 211 passes out of engagement with said lug, while the lugs of all unoperated arms will be engaged by the inner surfaces 213 of their respective cams, thereby locking all of said arms against operation until said cams have passed out of engagement with said lugs. The initial rising or inclined portions 215 of the cam surfaces 212, by engagement with the lugs 217, will cause an incompletely operated arm to be automatically moved into completely operated position, so that if a numeral key has been depressed a reasonable amount the proper completion of the computing operation controlled by said key will be insured and the remaining keys locked against operation until the completion of said operation. By reason of the projections 216 on the cam surfaces 212, the slides 75 are given an additional upward movement after the beginning of the computing operation, thereby insuring the engagement of the trip arms 142 with the stop screws 143 and the disengagement of the dogs 76 from the pins 770.

The length of the surfaces 212 and 213 on all of the cams 211 is, as will be understood, sufficient to insure the locking of the operating arms 77 in the manner above described until the shafts 60 and 183 have each made a substantially complete rotation, that is to say, until the computing operation initiated by the depression of one numeral key has been completed and the parts are in a position to insure the proper initiation of another computing operation upon the depression of the same or another numeral key.

The locking mechanism for the master gear above described, and comprising the rock shaft 169, arm 170, locking disk 172, etc., prevents overthrow of any totalizer gear 46 in engagement with the master gear, and consequently prevents overthrow of the corresponding number wheel 44. Moreover the plates 101 and 102 prevent the improper communication of rotary motion from one gear or number wheel to the next. At certain times, however, a limited amount of such rotary motion must be communicated through the transfer mechanism. When this takes place, however, it will be observed that the number wheel of the higher order, to which motion is communicated, is not connected with the master gear by its operating gear, so that the locking of the master gear by the mechanism above referred to will not operate to lock said number wheel of the higher order. In order to prevent the transfer mechanism, by reason of the somewhat sudden impact of the transfer tooth 111 upon the number wheel of the higher order, from moving said number wheel a greater amount than that represented by one tooth or unit (the maximum amount that any number wheel is properly actuated by the transfer mechanism at any one computing operation), the following mechanism is provided, reference being had to Figs. 2, 3 and 22: 218 denotes a cam on the shaft 183 and having a peripheral cam surface comprising a concentric portion 219 and a recess 220. Coöperating with the cam 218 is a lever 221 pivoted at 222 to one of the uprights 35 and having a projection 223 which, when the parts are in their normal or stationary position, is received in the recess 220. 224 denotes a rod pivoted at 225 to the lever 221 and guided for vertical movement in sleeves 226 secured to or formed on the adjacent upright 35. 227 denotes a spring surrounding said rod and interposed between one of the guides 226 and a collar 228 fast on said rod, whereby said rod is normally pressed downwardly and the lever 221 held in engagement with the cam 218. Secured to the rod 224 is an arm 229 connected by a preferably adjustable link 230 with an arm 231 on a rocker 232 pivoted at 233 in an auxiliary frame 234 secured to the upright 35. Pivoted on a rod 235 carried by said rocker is a series of fingers 236 equal in number to the number of index members of the totalizer and punctuation spaces therebetween collectively. The rocker 232, with its pivoted fingers 236, is so located with respect to the master gear and totalizer carriage that, as said totalizer carriage is fed along during the operation of the machine, each gear 46, as it passes out of engagement with the master gear, is brought opposite the first finger 236, and during subsequent feeding steps is brought opposite each of the other fingers of the series successively, so that when any totalizer gear is opposite the master gear each of the totalizer gears corresponding to number wheels of higher orders than that represented by the gears so engaged will be opposite one of the fingers 236. When the projection 223 on the lever 221 is in the notch 220 of the cam 218 the fingers 236 are in the retracted position shown in Figs. 3 and 22, but when said cam 218 is turned into any other angular position upward movement of the lever 221, rod 224, arm 229, and link 230 causes the rocker 232 to be turned upon its pivot and the fingers 236 projected forwardly into the spaces between the teeth of the gears 46 which are past the master gear. This condition will exist during substantially the complete rotation of the shaft 183, and since, as above explained, the entire computing and registering operation takes place during one rotation of said shaft, it follows that the fingers 236 will be in their forward or operative position throughout the entire period during which the master gear is operating the totalizer.

The fingers 236 are normally held in the position shown in Figs. 3 and 22 with respect to the rocker 232 by means of rods 237 located respectively above and below said fingers. The ends of said rods pass through short slots 238 in the frame 234, and are connected by springs 239 which normally press said rods toward one another and toward the inner ends of the slots 238, whereby said fingers are centered. Movement of the fingers 236 on their pivot is permitted by the springs 239, but such movement is limited by the length of the slots 238. The movement of the totalizer gears with which said fingers are in engagement is likewise limited by the movement of said fingers, and the slots 238 are of such a length as to permit such movement only of a totalizer gear as will provide for advancing the corresponding index member one number. Inasmuch as all of the totalizer gears representing index numbers of the higher order than that at any time operated by the master gear are in this manner limited in their movements, it follows that in no instance can the transfer mechanism operate to carry more than one number at a time to the index member of a higher order, irrespective of the speed at which the mechanism may be operated.

240 (see Fig. 3) denotes a locking plate secured to the upright 35 adjacent the master gear and adapted to engage the teeth of the totalizer gears prior to their engagement with the master gear in order to prevent their improper or accidental operation.

In order to prevent the forward feed of the typewriter and totalizer carriages until the result of any computing operation has been completely registered by the totalizer through the master gear, the following mechanism is provided, reference being had to Figs. 1 to 3 and 22: 241 denotes a rack bar secured to and moving with the totalizer carriage 41 and provided with notches corresponding in spacing to the feed spaces of the typewriter carriage. The rod 224 is extended upwardly above the arm 229 and is formed with a wedge-shaped upper end 242 adapted, when said bar is raised, to enter the notches in the rack bar 241. Inasmuch as the rod 224 is held in lifted position by the cam 218 during the entire computing operation, it will be seen that engagement of the end 242 thereof with the rack bar 241 will hold the totalizer carriage 41 against forward movement until the completion of the computing operation and the depression of the rod 224.

To the same end, and auxiliary to the lock last described, a lock is provided for the typewriter escapement. Referring to Figs. 1, 3 and 5, 243 denotes a link pivoted at one end to the typewriter escapement lever 33 and slotted at its opposite end to receive a pin 244 in a recess in a bracket 245 secured to the typewriter frame, whereby said link 243 is guided for longitudinal movement. The link 243 is provided with a locking shoulder 246 coöperating with a locking lever 247 pivoted in the bracket 245 and normally held in position to engage said shoulder upon the rearward movement of the link 243 by a spring 248 secured to the lower member of the totalizer carriage track 40. The rear end of the lever 247 is received in a slot 249 in a rod 250 secured at its lower end to the universal bar 200. 251 denotes an adjusting screw adapted, when the rod 250 and universal bar 200 are in their normal lowermost positions, to engage the end of the lever 247 and hold the same, against the tension of the spring 248, out of engagement with the shoulder 246. When, however, the universal bar 200 is raised by the operation of a numeral key lever, as above explained, the screw 251 is lifted, so that after rearward movement of the upper end of the typewriter escapement lever 33 incident to the depression of the numeral key, the shoulder 246 will be caught by the lever 247, and the forward movement of the lever 33 necessary to release the typewriter carriage is prevented until the return of the universal bar 200 to its lowermost position. This bar is, however, held elevated by the operating arm 77, which in turn is held by the corresponding cam 211, until the completion of the computing operation.

While two forms of escapement lock are herein shown and described, it will be obvious that either one might be used without the other if preferred.

The complete computing operation of the machine is as follows: Depression of a numeral key lever 27, by engagement of said lever with the adjusting screw 152 carried by the corresponding operating arm 77, causes the forward end of said arm to be depressed and the rearward end thereof to be elevated. At the same time the pin 154 is brought beneath the hooked lug 155, thereby coupling said key lever and operating arm together. Upward movement of the rear end of the arm 77 causes the rocker 197 to be operated, thereby releasing the clutch pin 188, coupling the shaft 183 to the sprocket 185, and causing said shaft to make one complete rotation with said sprocket, after which the parts are automatically unclutched as above explained. During this rotation of the cam shaft 183 the cams 211 thereon corresponding to the arms 77 which have not been operated lock said arms against operation. The cam 211 corresponding to the operated arm, however, serves, if necessary, further to raise the rear end of said arm into completely operated position, and also causes the forward end of said arm to be drawn downwardly and, by its connection with the key lever 27 through the lugs 154 and 155, to draw said key lever downwardly a sufficient distance to operate the type bar, thereby insuring the printing by the typewriting mechanism of the number registered by the totalizer. Upward movement of the rear end of the operated arm 77, acting through the slides 75 and 72 and toggle arms 73 and 74, throws outwardly the arms 64 and 69, thereby permitting the corresponding gear 62 to be clutched to the shaft 60 and make one complete rotation therewith, after which it is automatically unclutched therefrom and stopped in its initial position as heretofore explained. During the rotation of the shaft 183, and after the rotation of the gear 62 has commenced, the projection 216 on the cam 211 corresponding to the operated arm 77 acts to give the rear end of said arm an upward impulse, causing the disengagement of the dog 76 from the pin 770 and insuring the stopping of the gear 62 after one complete rotation. During the rotation of the gear 62 the cam 175 thereon, acting through the corresponding arm 176 and the rock shaft 169, raises the locking finger 171 and permits the shaft 57 to be rotated through the gears 62 and 61 an amount corresponding to the gear 62 in question, after which said shaft is automatically locked by the finger 171 against accidental overthrow. The rotation of the shaft 157 is transmitted through the shaft 53 to the shaft 48 and master gear 47 which serves to register the required amount upon the totalizer as heretofore more fully explained.

It will be seen that the mechanism above described may be operated at an extremely high rate of speed, depending only upon the speed of the motor 58 as transmitted through the gearing 57 to the shaft 60. It has been found that the shaft 60 may be run at such a speed as will require only a small fraction of a second for the completion of any computing operation, the various controlling and safety devices hereinbefore described positively insuring against any inaccuracy which might otherwise be incidental to such a high speed of operation.

Having thus described our invention, we claim:

1. In a calculating machine, in combination, computing mechanism, means for actuating the same, manually actuated operating members for controlling said computing mechanism, means for controlling said operating members, and means for operatively connecting said controlling means with said actuating means for actuation thereby at each operation of any of said operating members.

2. In a calculating machine, in combination, computing mechanism, means for actuating the same, operating arms for controlling said computing mechanism, a universal bar engaging said arms, a rocker operated by said universal bar, means for controlling said operating arms, and a clutch controlled by said rocker for operatively connecting said controlling means with said actuating means.

3. In a calculating machine, in combination, computing mechanism, a main shaft for actuating said computing mechanism, operating arms for controlling said computing mechanism, an auxiliary shaft provided with means for controlling said arms, a member mounted to rotate on said auxiliary shaft and operatively connected with said main shaft, a clutch for connecting said rotating member to said auxiliary shaft, an arm for controlling said clutch, a universal bar engaging said operating arms, a rocker operated by said universal bar, and a lever on said rocker for engaging and operating said clutch controlling arm.

4. In a calculating machine, in combination, computing mechanism, means for actuating the same, operating arms for controlling said computing mechanism, a shaft provided with means for controlling the arms, a clutch for operatively connecting said shaft with said actuating means, a lever for controlling said clutch, a rocker operated by said operating arms, a hooked lever on said rocker for engaging and operating said clutch controlling lever, and means to engage said last named lever and operate the same to release said clutch controlling lever.

5. In a calculating machine, in combination, a frame, computing mechanism in said frame, means for actuating said computing mechanism, operating arms for controlling said computing mechanism, a shaft provided with means for controlling said arms, a clutch for operatively connecting said shaft with said actuating means, a spring controlled lever for controlling said clutch, a rocker operated by said operating arms, a spring-controlled hooked lever on said rocker for engaging and operating said clutch controlling lever, said hooked lever having a cam surface, and a stationary member on said frame adapted to engage said cam surface and move said hooked lever out of engagement with said clutch controlling lever when said rocker is operated.

6. In a calculating machine, in combination, computing mechanism, means for actuating the same, operating members for controlling said computing mechanism, a shaft provided with means for controlling said operating members, means controlled by said operating members for operatively connecting said shaft with said actuating means and disconnecting the same therefrom, and means for automatically stopping said shaft at a predetermined point when disconnected from said actuating means.

7. In a calculating machine, in combination, computing mechanism, means for actuating the same, operating members for controlling said computing mechanism, a shaft provided with means for controlling said operating members, a clutch for operatively connecting said shaft with said actuating means, means for controlling said clutch, means actuated by said operating members for operating said clutch controlling means, means for automatically disconnecting said clutch controlling means from its operating means, and means for stopping said shaft at a predetermined point when disconnected from said actuating means.

8. In a calculating machine, in combination, computing mechanism, means for actuating the same, operating members for controlling said computing mechanism, a shaft provided with means for controlling said operating members, a rotary member loose on said shaft and operatively connected with said actuating means, a hub fast on said shaft and provided with a flange having a notch, a clutch for connecting said hub and rotary member, means actuated by said operating members for controlling said clutch, and a spring controlled stop arm having means adapted to travel on said flange and to engage said notch to stop said shaft in a predetermined position.

9. In a calculating machine, in combination, computing mechanism, an actuating shaft therefor, operating members for controlling said computing mechanism, an auxiliary shaft provided with means for controlling said operating members, a sprocket fast on said actuating shaft, a sprocket loose on said auxiliary shaft, a chain connecting said sprockets, a clutch for connecting said last named sprocket to said auxiliary shaft, and means operated by said operating members for controlling said clutch.

10. In a calculating machine, in combination, computing mechanism, a plurality of manually actuated operating members for controlling said computing mechanism, a plurality of cams each adapted to engage an operated member and hold the same in operated position until the completion of the computing operation controlled by said member, and means for actuating said computing mechanism and cams.

11. In a calculating machine, in combination, computing mechanism, means for actuating the same, a plurality of manually actuated operating members for controlling said computing mechanism, a shaft provided with a plurality of cams each adapted to engage an operated member and hold the same in operated position until the completion of the computing operation controlled by said member, and means controlled by said operating members for operatively connecting said controlling means with said actuating means.

12. In a calculating machine, in combination, computing mechanism, a plurality of manually operated arms for controlling said computing mechanism and having laterally projecting lugs, a plurality of cams having cam surfaces adapted to engage said lugs and control said arms, and means for actuating said computing mechanism and cams.

13. In a calculating machine, in combination, computing mechanism, means for actuating the same, operating members for controlling said computing mechanism, a shaft provided with a plurality of cams adapted when one of said operating members has been operated to lock the other members against operation, and means controlled by said operating members for operatively connecting said shaft with said actuating means.

14. In a calculating machine, in combination, computing mechanism, a plurality of operating members for controlling said computing mechanism, a plurality of cams each adapted to engage an operated member and hold the same in operated position until the completion of the computing operation controlled thereby and each adapted to engage an unoperated member and lock the same against operation, and means for actuating said computing mechanism and cams.

15. The combination with computing mechanism, of a plurality of manually actuated operating members each adapted when operated to set into operation said computing mechanism in a predetermined manner, and automatic means for positively completing the operation of a partly operated member.

16. The combination with computing mechanism, of a plurality of manually actuated operating members each adapted when operated to set into operation the said computing mechanism in a predetermined manner, and automatic means for positively completing the operation of a partly operated member and holding the same in operated position until the completion of the computing operation controlled thereby.

17. The combination with computing mechanism, of a plurality of manually actuated operating members each adapted when operated to set into operation said computing mechanism in a predetermined manner, a plurality of cams each adapted to engage a partly operated member and positively complete the operation thereof, and means for actuating said computing mechanism and cams.

18. In a calculating machine, in combination, computing mechanism, means for actuating the same, manually actuated operating members for controlling said computing mechanism, a shaft provided with a plurality of cams each adapted to engage a partly operated member and positively complete the operation thereof, and means controlled by said operating members for operatively connecting said shaft with said actuating means.

19. In a calculating machine, in combination, computing mechanism, means for actuating the same, operating arms for controlling said computing mechanism, a shaft provided with a plurality of cams each adapted to engage a partly operated arm and positively complete the operation thereof, a clutch for operatively connecting said shaft with said actuating means, a lever for controlling said clutch, a rocker operated by said operating arms, a hooked lever on said rocker for engaging and operating said clutch-controlling lever, and means adapted when an operating arm is fully operated to engage said hooked lever and release the same from said clutch controlling lever.

20. In a calculating machine, in combination, computing mechanism, a plurality of cams having inner and outer cam surfaces, actuating means for said computing mechanism and cams, and a plurality of operating arms equal in number to said cams for controlling said computing mechanism, said arms having means to coöperate with said cams adapted when an arm is operated to engage one of the cam surfaces of the corresponding cam to lock said arm in operated position and when an arm is unoperated to engage the other of the cam surfaces of the corresponding cam to lock said arm against operation.

21. In a calculating machine, in combination, computing mechanism, a main shaft for actuating said computing mechanism, an auxiliary shaft provided with a plurality of cams having inner and outer cam surfaces, a plurality of operating arms equal in number to said cams for controlling said computing mechanism, and means for operatively connecting said auxiliary shaft with said main shaft when one of said arms is operated, said arms having means to coöperate with said cams adapted when an arm is operated to engage one of the cam surfaces of the corresponding cam to lock said arm in operated position, and when an arm is unoperated to engage the other of the cam surfaces of the corresponding cam to lock said arm against operation.

22. In a calculating machine, in combination, computing mechanism, a plurality of cams having inner and outer cam surfaces meeting in an edge, actuating means for said computing mechanism and cams, a plurality of operating arms equal in number to said cams for controlling said computing mechanism, and wedge shaped lugs projecting from said arms adapted, when an arm is operated, to engage the outer cam surface of the corresponding cam to lock said arm in operated position, and when an arm is unoperated to engage the inner cam surface to the corresponding cam and lock said arm against operation.

23. In a calculating machine, in combination, computing mechanism, actuating means therefor, devices for controlling the connection of said computing mechanism with said actuating means, members for operating said controlling devices, means for connecting said operating members and controlling devices, means for automatically disconnecting said operating members and controlling devices before the completion of each computing operation, and means controlled by said operating members for operatively connecting said last-named means with said actuating means.

24. In a calculating machine, in combination, computing mechanism, actuating means therefor, devices for controlling the connection of said computing mechanism with said actuating means, members for operating said controlling devices, means for connecting said operating members and controlling devices and for disconnecting the same when said operating members are fully operated, and devices each adapted to positively complete the operation of a partly operated member to automatically disconnect said operating members and controlling devices before the completion of each computing operation.

25. In a calculating machine, in combination, computing mechanism, actuating means therefor, devices for controlling the connection of said computing mechanism with said actuating means, members for operating said controlling devices, means for connecting said operating members and controlling devices, a plurality of cams each adapted to engage an operating member and impart to the same a positive movement, and means adapted when such operating member is so moved to engage said connecting means and automatically disconnect said operating members from the corresponding controlling device.

26. In a calculating machine, in combination, computing mechanism, actuating means therefor, devices for controlling the connection of said computing mechanism with said actuating means, members for operating said controlling devices, means for connecting said operating members and controlling devices, a plurality of cams engaging and controlling said operating members respectively, each of said cams having a portion adapted to engage a partly operated member and hold the same in operated position until the completion of the computing operation controlled thereby, a portion adapted to engage an unoperated member and lock the same against movement, and a portion adapted to impart to the operating member an additional positive movement, means adapted when an operating member is so additionally and positively moved to engage said connecting means and automatically disconnect said operating member from the corresponding controlling device, and means controlled by said operating members for operatively connecting said cams with said actuating means.

27. In a calculating machine, in combination, computing mechanism, operating members for controlling said computing mechanism, and a shaft provided with a plurality of cams for engaging and controlling said operating members respectively, each of said cams having an inclined portion for completing the operation of a partly operated member and a portion concentric with said shaft for locking said member in operated position until the completion of the computing operation.

28. In a calculating machine, in combination, computing mechanism, actuating means therefor, devices for controlling the connection of said computing mechanism with said actuating means, members for operating said controlling devices, means for connecting said operating members and controlling devices, a shaft provided with a plurality of cams for engaging and controlling said operating members respectively, each of said cams having a portion concentric with said shaft and a projection adapted to impart to the corresponding operating member a positive movement, and means adapted when such operating member is so moved to engage the connecting means and automatically disconnect said operating member from the corresponding controlling device.

29. In a calculating machine, in combination, computing mechanism, actuating means therefor, devices for controlling the connection of said computing mechanism with said actuating means, members for operating said controlling devices, means for connecting said operating members and controlling devices, a shaft provided with a plurality of cams for engaging and controlling said operating members respectively, each of said cams having an inclined portion for completing the operation of a partly operated member, a portion concentric with said shaft for locking said member in operated position until the completion of the computing operation, and a projection adapted to impart to said member a positive movement, and means adapted when said operating member is so moved to engage said connecting means and automatically disconnect said operating member from the corresponding controlling device.

30. In a calculating machine, in combination, computing mechanism, actuating means therefor, devices for controlling the connection of said computing mechanism with said actuating means, a series of slides provided with means for operating said controlling devices, a second series of slides provided with means for operating said first named slides, and a series of members for operating said last named slides.

31. In a calculating machine, in combination, computing mechanism, actuating means therefor, devices for controlling the connection of said computing mechanism with said actuating means, a series of slides provided with means for operating said controlling devices, a second series of slides provided with means for connection with said first-named slide, a series of members for operating said last-named slide, and means for automatically disconnecting said last-named slides from said first-named slides before the completion of each computing operation.

32. In a calculating machine, in combination, computing mechanism, actuating means therefor, devices for controlling the connection of said computing mechanism with said actuating means, a series of slides provided with means for operating said controlling device and with projecting studs, a second series of slides having bifurcated ends embracing and guided by said studs, said last-named slides being further provided with means for engaging said studs to operate said last-named slides, and a series of members for operating said last named slides.

33. In a calculating machine, in combination, computing mechanism, actuating means therefor, devices for controlling the connection of said computing mechanism with said actuating means, a series of slides provided with means for operating said controlling devices and with projecting studs, a second series of slides provided with pivoted dogs for engaging said studs and operating said first-named slides, and a series of members for operating said last-named slides.

34. In a calculating machine, in combination, computing mechanism, actuating means therefor, devices for controlling the connection of said computing mechanism with said actuating means, a series of slides provided with means for operating said controlling devices and with projecting studs, a second series of slides having bifurcated ends embracing and guided by said studs and provided with pivoted dogs for engaging said studs and operating said first named slides, and a series of members for operating said last-named slides.

35. In a calculating machine, in combination, computing mechanism, actuating means therefor, devices for controlling the connection of said computing mechanism with said actuating means, a series of slides provided with means for operating said controlling devices and with projecting studs, a second series of slides provided with pivoted dogs for engaging said studs and operating said first named slides, a series of members for operating said last named slides, and means adapted when said members are operated to engage said dogs and disengage the same from said studs.

36. In a calculating machine, in combination, computing mechanism, actuating means therefor, devices for controlling the connection of said computing mechanism with said actuating means, a series of slides provided with means for operating said controlling devices and with projecting studs, a second series of slides provided with pivoted dogs for engaging said studs and operating said first named slides, a series of members for operating said last named slides, a shaft provided with a plurality of cams for engaging and controlling said operating members respectively, each of said cams having a portion concentric with said shaft and a projection adapted to impart to the corresponding operating member a positive movement, and means adapted when said operating member is so moved to engage the corresponding dog and disengage the same from the corresponding stud.

37. In a calculating machine, in combination, computing mechanism, actuating means therefor, devices for controlling the connection of said computing mechanism with said actuating means, a series of slides provided with means for operating said controlling devices and with projecting studs, a second series of slides provided with pivoted dogs for engaging said studs and operating said first named slides, stop devices for engaging said dogs when said last named slides are operated and disengaging the same from said studs, a series of operating arms connected with said last named slides, a shaft, a clutch for operatively connecting said shaft with said actuating means, a lever for controlling said clutch, a rocker operated by said operating arms, a hooked lever on said rocker for engaging and operating said clutch controlling lever, means adapted when said rocker is operated to engage said last named lever and operate the same to release said clutch controlling lever, and a series of cams on said shaft for engaging and controlling said operating arms respectively, each of said cams having a portion adapted to impart to the corresponding arm a positive movement.

38. In a calculating machine, in combination, a frame, computing mechanism in said frame, actuating means therefor, devices for controlling the connection of said computing mechanism with said actuating means, a series of slides provided with means for operating said controlling devices and with projecting studs, a second series of slides provided with pivoted dogs for engaging said studs and operating said first named slides, said dogs having projecting trip arms, a series of stop screws adjustably carried by said frame and adapted when said last named slides are operated to engage said trip arms and turn said dogs on their pivots so as to disengage the same from said studs, and a series of members for operating said last named slides.

39. In a calculating machine, in combination, computing mechanism, actuating means therefor, devices for controlling the connection of said computing mechanism with said actuating means, a series of slides provided with pivoted arms for engaging and operating said controlling devices, a second series of slides provided with means for operating said first-named slides, and a series of members for operating said last named slides.

40. In a calculating machine, in combination, computing mechanism, actuating means therefor, devices for controlling the actuation of said computing mechanism by said actuating means, said devices being arranged in pairs, slides each provided with a pair of toggle arms for operating the controlling devices of each pair, and means for operating said slides.

41. In a calculating machine, in combination, a frame, computing mechanism in said frame, actuating means therefor, a series of arms pivoted in said frame for controlling the actuation of said computing mechanism by said actuating means, said arms being arranged in pairs and being provided with recesses, slides guided for vertical movement in said frame and each having a pair of toggle arms pivoted thereto and engaging the recesses in said controlling arms, whereby as said slides are raised said arms are swung upon their pivots, and means for operating said slides.

42. In a calculating machine, in combination, an actuating shaft, a plurality of computing devices on said shaft, a plurality of clutch devices for independently connecting said computing devices to said shaft, a plurality of arms for controlling said clutch devices, a plurality of stop arms for arresting the movement of said computing devices when disconnected from said shaft, a plurality of slides each provided with means for operating one of said clutch controlling arms and the corresponding stop arm, and means for operating said slides.

43. In a calculating machine, in combination, an actuating shaft, a plurality of computing devices on said shaft, a plurality of clutch devices for independently connecting said computing devices to said shaft, a plurality of arms for controlling said clutch devices, a plurality of stop arms for arresting the movement of said computing devices when disengaged from said shaft, a plurality of slides each provided with a pair of toggle arms for operating one of said clutch controlling arms and a corresponding stop arm, and means for operating said slides.

44. In a calculating machine, computing mechanism comprising a shaft, a series of mutilated gears rotatably mounted on said shaft, means for operatively connecting said gears and shaft, and a second series of gears coöperating with and actuated by said first named gears respectively, said last named gears being provided with teeth having abrupt rear faces and inclined front faces.

45. In a calculating machine, the combination with totalizing mechanism and computing mechanism for variably operating said totalizing mechanism, of means for actuating said computing mechanism, means for controlling said computing mechanism to cause said totalizing mechanism to be actuated a predetermined amount, and automatic locking means for preventing operation of said totalizing mechanism by said computing mechanism to a greater extent than said predetermined amount.

46. In a calculating machine, in combination, totalizing mechanism, an actuating shaft, a series of computing devices and a series of cams on said shaft, means for selectively connecting said computing devices and cams to said shaft for operation thereby, means for operatively connecting said computing devices and totalizing mechanism, and means controlled by said cams for automatically locking said connecting means against overthrow.

47. In a calculating machine, in combination, totalizing mechanism, an actuating shaft, a series of mutilated gears on said shaft and provided on their lateral faces with cams, means for selectively connecting said gears with said shaft for operation thereby, a counter-shaft operatively connected with said totalizing mechanism and provided with a series of gears coöperating with said mutilated gears, and means controlled by said cams for locking said counter-shaft against overthrow.

48. In a calculating machine, in combination, totalizing mechanism, an actuating shaft, a series of computing devices and a series of cams on said shaft, means for selectively connecting said computing devices and cams with said shaft for operation thereby, means for operatively connecting said computing devices and totalizing mechanism, and means for locking said connecting means including a rock shaft and arms on said rock shaft coöperating with said cams.

49. In a calculating machine, in combination, totalizing mechanism, an actuating shaft, a series of computing devices and a series of cams on said shaft, means for selectively connecting said computing devices and cams with said shaft for operation thereby, means operatively connecting said computing devices and totalizing mechanism including a counter-shaft, a locking disk on said counter-shaft provided with a series of notches, an arm having a finger adapted to engage said notches and lock said counter-shaft, a rock shaft on which said arm is mounted, and arms on said rock shaft coöperating with said cams.

50. In a calculating machine, in combination, totalizing mechanism, an actuating shaft, a series of mutilated gears on said shaft and provided on their lateral faces with cams, means for selectively connecting said gears with said shaft for operation thereby, a counter-shaft operatively connected with said totalizing mechanism and provided with a series of gears coöperating with said mutilated gears, a locking disk on said counter-shaft provided with a series of notches, an arm having a finger adapted to engage said notches and lock said shaft, a rock shaft on which said arm is mounted, and arms on said rock shaft coöperating with said cams.

51. In a calculating machine, in combination, totalizing mechanism including a series of operating gears, a master gear, said totalizing mechanism and master gear being relatively movable to bring said totalizer gears successively into operative relationship to said master gear, computing mechanism for variably operating said master gear, means for actuating said computing mechanism, means for controlling said computing mechanism to cause said totalizing mechanism to be actuated a predetermined amount, automatic locking means for preventing operation of said totalizing mechanism to a greater extent than said predetermined amount, and means operated by said last named means for positioning said master gear angularly.

52. In a calculating machine, in combination, totalizing mechanism including a series of operating gears, a master gear, said totalizing mechanism and master gear being relatively movable to bring said totalizer gears successively into operative relationship to said master gear, a shaft on which said master gear is mounted, an actuating shaft, a series of computing devices and a series of cams on said actuating shaft, means for selectively connecting said computing devices and cams with said actuating shaft for operation thereby, a counter-shaft operated by said computing devices and operatively connected with said master gear shaft, a locking disk on said counter-shaft provided with a series of notches, an arm having a finger adapted to engage said notches and lock said counter-shaft, a rock shaft on which said arm is mounted, arms on said rock shaft coöperating with said cams, a member on said master gear shaft provided with a series of angular notches, a lever having a wedge-shaped end coöperating with said notches to position said master gear angularly, and an arm on said rock shaft for operating said lever.

53. In a calculating machine, computing mechanism comprising a series of gears having a progressively varying number of teeth, an actuating shaft on which said gears are mounted, said gears being grouped in pairs on said shaft, and a counter-shaft provided with a series of gears, each pair of said first named gears coöperating with a single gear on said counter-shaft.

54. In a calculating machine, in combination, a continuously rotating actuating shaft, a series of hubs fast on said shaft, a pair of computing devices on said shaft arranged on opposite sides of each of said hubs, and a clutch device operatively connecting each of said computing devices with the corresponding hub.

55. The combination with totalizing mechanism, computing mechanism, means operated by said computing mechanism for variably actuating said totalizing mechanism, said totalizing mechanism and actuating means being relatively movable into and out of different positions of operative engagement, a series of operating arms, and devices operated by said arms for controlling said computing mechanism, of a universal bar operable by any of said arms, means for locking said totalizing mechanism and actuating means against relative movement, means actuated independently of said arms and controlling devices for operating said locking means, and means operated by said universal bar for controlling said operating means.

56. The combination with a typewriter comprising a frame, numeral keys, a carriage, and escapement mechanism for controlling the movement of said carriage, of a computing mechanism on said typewriter frame, totalizing mechanism operatively connected to and movable with said typewriter carriage relative to said computing mechanism, means operated by said computing mechanism for variably actuating said totalizing mechanism, a series of operating arms for controlling said computing mechanism operatively connected with the typewriter numeral keys, a universal bar operable by any of said arms, a rod connected to said universal bar, said rod having a slot, a spring pressed lever for locking said escapement mechanism having an end received in said slot, and an adjusting screw carried by said rod and engaging said lever for controlling the same.

57. The combination with totalizing mechanism, computing mechanism, means operated by said computing mechanism for variably actuating said totalizing mechanism, said totalizing mechanism and actuating means being relatively movable into and out of different positions of operative engagement, a series of operating arms, and devices operated by said arms for controlling said computing mechanism, of a universal bar operable by any of said arms, means for locking said totalizing mechanism and actuating means against relative movement, a cam for controlling said locking means, a shaft on which said cam is mounted, a clutch for controlling said shaft, and means operated by said universal bar for controlling said clutch.

58. The combination with totalizing mechanism, computing mechanism, means operated by said computing mechanism for variably actuating said totalizing mechanism, said totalizing mechanism and actuating means being relatively movable into and out of different positions of operative engagement, a series of operating arms, and devices operated by said arms for controlling said computing mechanism, of means for locking said totalizing mechanism and actuating means against relative movement, a shaft provided with a cam for controlling said locking means and with cams for controlling said arms, means for actuating said shaft, a universal bar operable by any of said arms, a rocker operated by said universal bar, and a clutch controlled by said rocker for operatively connecting said shaft with its actuating means.

59. The combination with totalizing mechanism, computing mechanism, means operated by said computing mechanism for variably actuating said totalizing mechanism, said totalizing mechanism and actuating means being relatively movable into and out of different positions of operative engagement, a series of operating members, and devices operated by said members for controlling said computing mechanism, of means for locking said totalizing mechanism and actuating means against relative movement, a series of cams each adapted to engage an operated member and hold the same in operated position until the completion of the computing operation controlled by said member, means for actuating said cams, means engaged and operated by said members for controlling said locking means, and means controlled by said last named means for controlling the actuation of said cams.

60. The combination with a typewriter comprising a frame, numeral keys, a carriage, and an escapement mechanism for controlling the movement of said carriage, of a computing mechanism on said typewriter frame, totalizing mechanism operatively connected to and movable with said typewriter carriage relative to said computing mechanism, means operated by said computing mechanism for variably actuating said totalizing mechanism, operating members for controlling said computing mechanism operatively connected with the typewriter numeral keys, a link or rod connected with said escapement mechanism and having a locking shoulder, a locking lever adapted to engage said shoulder and lock said escapement mechanism, and means operated by said operating members for controlling said lever.

61. The combination with a typewriter comprising a frame, numeral keys, a carriage, and an escapement mechanism for controlling the movement of said carriage, of a computing mechanism on said typewriter frame, totalizing mechanism operatively connected to and movable with said typewriter carriage relative to said computing mechanism, means operated by said computing mechanism for variably actuating said totalizing mechanism, operating members for controlling said computing mechanism operatively connected with the typewriter numeral keys, a link or rod connected with said escapement mechanism and having a locking shoulder, a locking lever adapted to engage said shoulder and lock said escapement mechanism, a universal bar operable by any of said operating members, and means operated by said universal bar for controlling said locking lever.

62. The combination with totalizing mechanism, computing mechanism, means operated by said computing mechanism for variably actuating said totalizing mechanism, said totalizing mechanism and actuating means being relatively movable into and out of different positions of operative engagement, and a series of operating arms for controlling said computing mechanism, of a universal bar operable by any of said arms, a rocker operated by said universal bar, means for controlling said operating arms, means for locking said totalizing mechanism and actuating means against relative movement, means for controlling said locking means, actuating means for both said controlling means, and a clutch controlled by said rocker for operatively connecting both said controlling means with said actuating means.

63. The combination with a frame, a carriage movably mounted on said frame and provided with a series of notches, totalizing mechanism on said carriage, computing mechanism in said frame, means operated by said computing mechanism for variably actuating said totalizing mechanism, a series of operating members, and devices operated by said members for controlling said computing mechanism, of a shaft journaled in said frame, means operated by said operating members for controlling said shaft, a cam on said shaft, a lever coöperating with said cam, and a rod operated by said lever and having an end adapted to engage the notches in said carriage and lock the same against movement.

64. The combination with a frame, a carriage movably mounted on said frame and provided with a series of notches, totalizing mechanism on said carriage, computing mechanism in said frame, means operated by said computing mechanism for variably actuating said totalizing mechanism, said totalizing mechanism and actuating means being relatively movable into and out of different positions of operative engagement, and a series of operating arms for controlling said computing mechanism, of a shaft journaled in said frame, a cam on shaft, a lever coöperating with said cam, a rod operated by said lever and having an end adapted to engage the notches in said carriage and lock the same against movement, a universal bar operable by any of said operating arms, and means operated by said universal bar for controlling said shaft.

65. In a calculating machine, in combination, totalizing mechanism comprising a series of index members and transfer devices connecting said index members, computing mechanism for successively actuating said index members, a main shaft for actuating said computing mechanism, operating members for controlling said computing mechanism, means for limiting the movement of said index members, an auxiliary shaft provided with means for controlling said operating members and with a cam for operating said limiting means, and means for operatively connecting said auxiliary shaft with said main shaft when any of said members is operated.

66. In a calculating machine, in combination, a frame, a carriage movably mounted on said frame and provided with a series of notches, totalizing mechanism on said carriage comprising a series of index members and transfer devices connecting said index members, computing mechanism in said frame, means operated by said computing mechanism for variably actuating said totalizing mechanism, a series of operating members for controlling said computing mechanism, a shaft journaled in said frame, means operated by said operating members for controlling said shaft, a cam on said shaft, a lever coöperating with said cam, a rod operated by said lever and having an end adapted to engage the notches in said carriage and lock the same against movement, and means operated by said rod for limiting the movement of said index members.

67. In a calculating machine, in combination, totalizing mechanism comprising a series of index members, gears for operating said index members, and transfer devices connecting said index members, computing mechanism, a master gear operated by said computing mechanism for successively engaging and operating said operating gears, a series of fingers arranged to engage said operating gears after their disengagement from said master gear, operating members for controlling said computing mechanism, a cam and connections for operating said fingers, and means controlled by said operating members for actuating said cam.

68. In a calculating machine, in combination, totalizing mechanism comprising a series of index members, gears for operating said index members, and transfer devices connecting said index members, computing mechanism, a master gear operated by said computing mechanism for successively engaging and operating said operating gears, a series of fingers arranged to engage said operating gears after their disengagement from said master gear, a rocker by which said fingers are carried, and means for operating said rocker at each computing operation.

69. In a calculating machine, in combination, totalizing mechanism comprising a series of index members, gears for operating said index members, and transfer devices connecting said index members, computing mechanism, a master gear operated by said computing mechanism for successively engaging and operating said operating gears, a series of fingers arranged to engage said operating gears after their disengagement from said master gear, a rocker on which said fingers are yieldingly mounted, and means for operating said rocker at each computing operation.

70. In a calculating machine, in combination, totalizing mechanism comprising a series of index members, gears for operating said index members, and transfer devices connecting said index members, computing mechanism, a master gear operated by said computing mechanism for successively engaging and operating said operating gears, a series of movable fingers arranged to engage said operating gears after their disengagement from said master gear, and means for limiting the movement of said fingers.

71. In a calculating machine, in combination, totalizing mechanism comprising a series of index members, and transfer devices connecting said index members, computing mechanism, a master gear operated by said computing mechanism for successively engaging and operating said operating gears, a series of fingers arranged to engage said operating gears after their disengagement from said master gear, a rocker on which said fingers are yieldingly mounted, means for limiting the movement of said fingers on said rocker, and means for operating said rocker at each computing operation.

72. In a calculating machine, in combination, totalizing mechanism comprising a series of index members, gears for operating said index members, and transfer devices connecting said index members, computing mechanism, a master gear operated by said computing mechanism for successively engaging and operating said operating gears, a series of fingers arranged to engage said operating gears after their disengagement from said master gear, and means for retracting said fingers from engagement with said gears at the completion of each computing operation.

73. In a calculating machine, in combination, totalizing mechanism comprising a series of index members, gears for operating said index members, and transfer devices connecting said index members, computing mechanism, a master gear operated by said computing mechanism for successively engaging and operating said operating gears, a frame having slots, a series of fingers pivoted in said frame and arranged to engage said operating gears after their disengagement from said master gear, rods engaging said fingers and working in said slots to limit the movement of said fingers on their pivots, and springs engaging said rods to center said fingers.

74. In a calculating machine, in combination, a totalizing mechanism comprising a series of index members, gears for operating said index members, and transfer devices connecting said index members, computing mechanism, a master gear operated by said computing mechanism for successively engaging and operating said operating gears, a frame having slots, a rocker pivoted in said frame, means for operating said rocker at each computing operation, a series of fingers pivoted on said rocker and arranged to engage said operating gears after their disengagement from said master gear, rods engaging said fingers and working in said slots to limit the movement of said fingers on their pivots, and springs engaging said rods to center said fingers.

75. In a totalizer for calculating machines, in combination, a plurality of index members, operating devices for said members, transfer devices connecting said members and capable of being rendered operative or inoperative, and rigidly supported means carried by said totalizer for positively and automatically controlling the operativeness of said transfer devices.

76. In a totalizing mechanism, in combination, an operating gear, a member slidably mounted on the face of said gear and provided with a transfer tooth, and rigid means for positively controlling said member.

77. In a totalizer for calculating machines, in combination, a plurality of index members, operating devices for said members, transfer devices connecting said members and capable of being rendered operative or inoperative, and adjustable means for automatically controlling the operativeness of said transfer devices.

78. In a totalizer for calculating machines, in combination, a plurality of index members, operating devices for said members, transfer devices connecting said members and capable of being rendered operative and inoperative, and rigidly but adjustably supported means carried by said totalizer for positively and automatically controlling the operativeness of said transfer devices.

79. In a totalizing mechanism, in combination, an operating gear, a member slidably mounted on the face of said gear and provided with transfer teeth, and adjustably supported means engaging said teeth for controlling said member.

80. In a totalizing mechanism, in combination, a shaft, a series of number wheels mounted on said shaft, a second shaft, a series of operating gears mounted on said last-named shaft, a disk slidably mounted on the face of each of said gears and provided with a transfer tooth, and means for engaging and controlling said members, said last named means being adjustable to positions at opposite sides of the plane connecting the axes of said shafts.

81. In a totalizing mechanism, in combination, a frame, an operating gear, a member slidably mounted on the face of said gear and provided with a transfer tooth, and a roller for engaging and controlling said member, said roller having eccentric journals mounted to turn in said frame.

82. In a totalizing mechanism, in combination, a frame, a shaft mounted in said frame, a series of number wheels on said shaft, a second shaft mounted in said frame, a series of operating gears on said last named shaft, a disk slidably mounted on the face of each of said gears and provided with a transfer tooth, and a roller for engaging and controlling said disks, said roller having eccentric journals mounted to turn in said frame, the axis of said journals lying in the plane connecting the axes of said shafts.

83. In a totalizing mechanism, in combination, a frame, an operating gear, a member slidably mounted on the face of said gear and provided with a transfer tooth, a roller for engaging and controlling said member, said roller having eccentric journals mounted to turn in said frame, a pinion carried by one of said journals, and a rack engaging said pinion and slidably mounted on said frame.

84. In a totalizer for calculating machines, a frame, a series of co-axially arranged, independently rotatable members in said frame, and separator plates interposed between said members, and said plates having projections secured to said frame.

85. In a totalizer for calculating machines, a frame, a series of co-axially arranged, independently rotatable members in said frame, separator plates interposed between said members, said plates being provided with bifurcated projections, and rods supported in said frame and embraced by said projections.

86. The combination with a typewriter including printing mechanism and key levers for operating the same, of calculating mechanism controlled by said key levers, and automatic means actuated by said calculating mechanism for further operating a partially depressed key lever to a sufficient extent to operate said printing mechanism.

87. The combination with a typewriter including printing mechanism and key levers for operating the same, of computing mechanism, operating arms for controlling said computing mechanism, said arms being arranged in the paths of movement of said key levers but being normally disconnected therefrom, and coöperating means on said key levers and arms for coupling a key lever to the corresponding arm when said key lever is depressed.

88. The combination with a typewriter including printing mechanism and key levers for operating the same, of computing mechanism, actuating means therefor, operating arms for controlling said computing mechanism, said arms being arranged in the paths of movement of said key levers but being normally disconnected therefrom, coöperating means on said key levers and arms for coupling a key lever to the corresponding arm when said key lever is depressed, and automatic means operated by said actuating means for further operating a partially operated arm and thereby completing the operation of a partially depressed key lever to a sufficient extent to operate said printing mechanism.

89. The combination with a typewriter including printing mechanism and key levers for operating the same, of computing mechanism, means for actuating said computing mechanism, operating arms for controlling said computing mechanism, said arms being arranged in the paths of movement of said key levers but being normally disconnected therefrom, coöperating means on said key levers and arms for coupling a key lever to the corresponding arm when said key lever is depressed, means for positively completing the operation of a partly operated arm, and means for operatively connecting said controlling means with said actuating means at each operation of any of said arms.

90. The combination with a typewriter including printing mechanism and key levers for operating the same, of computing mechanism, operating arms for controlling said computing mechanism, said arms being arranged in the paths of movement of said key levers, a pair of arms carried by the end of each of said operating arms and loosely embracing the corresponding key lever, and lugs projecting from said last named arms and said key levers respectively and adapted when a key lever is depressed to interengage and positively couple said key lever and operating arm.

91. The combination with a typewriter including printing mechanism and key levers for operating the same, of computing mechanism, means for actuating said computing mechanism, operating arms for controlling said computing mechanism, said arms being arranged in the paths of movement of said key levers, a pair of arms carried by the end of each of said operating arms and loosely embracing the corresponding key lever, lugs projecting from said last named arms and said key levers respectively and adapted when a key lever is depressed to interengage and positively couple said key lever and operating arm, a shaft provided with a plurality of cams each adapted to engage a partly operated operating arm and positively complete the operation thereof, and means controlled by said operating arms for operatively connecting said shaft with said actuating means.

92. In a calculating machine, in combination, computing mechanism, an electric motor for actuating the same, a switch for controlling said motor, means for controlling said computing mechanism, means for connecting said controlling means with the key levers of a typewriter for operation thereby, and means for rendering said connecting means operative and inoperative and for simultaneously operating said switch.

93. In a calculating machine, in combination, a frame, computing mechanism in said frame, an electric motor for actuating said computing mechanism, a switch for controlling said motor, a series of operating arms for controlling said computing mechanism, a shaft upon which said arms are fulcrumed, said shaft having eccentric journals mounted in said frame, and means operated by said shaft for operating said switch.

94. In a calculating machine, in combination, a frame, computing mechanism in said frame, an electric motor for actuating said computing mechanism, a switch for controlling said motor, a plunger for operating said switch, a series of operating arms for controlling said computing mechanism, a shaft on which said arms are fulcrumed, said shaft having eccentric journals mounted in said frame, and a series of levers operatively connecting said shaft and plunger.

In testimony whereof we affix our signatures, in presence of two witnesses.

THOMAS D. CRIST.
GEORGE H. SPITZLI.

Witnesses:
ARTHUR S. COTINS,
FRED'A H. HYDE.